United States Patent [19]
Takita

[11] Patent No.: US 6,215,501 B1
[45] Date of Patent: Apr. 10, 2001

[54] METHOD AND FILLING A POLYGON AND RECORDING MEDIUM

[75] Inventor: Hiroki Takita, Tokyo (JP)

[73] Assignee: Mitsubishi Denki Kabushiki Kaisha, Tokyo (JP)

[*] Notice: Subject to any disclaimer, the term of this patent is extended or adjusted under 35 U.S.C. 154(b) by 0 days.

[21] Appl. No.: 08/947,017

[22] Filed: Oct. 8, 1997

[30] Foreign Application Priority Data

May 27, 1997 (JP) ................................ 9-136693

[51] Int. Cl.[7] .................................................. G06T 15/00
[52] U.S. Cl. ................................................... 345/429
[58] Field of Search .............................. 345/418, 419, 345/425, 428, 429, 430

[56] References Cited

U.S. PATENT DOCUMENTS

| 5,553,219 | 9/1996 | Kurashige . | |
|---|---|---|---|
| 5,668,940 | * 9/1997 | Steiner et al. | 345/429 |
| 5,710,578 | * 1/1998 | Beauregard et al. | 345/429 |
| 5,757,375 | * 5/1998 | Kawase | 345/429 |
| 5,764,243 | * 6/1998 | Baldwin | 345/429 |
| 5,781,197 | * 7/1998 | Saunders | 345/429 |
| 5,818,456 | * 10/1998 | Cosman et al. | 345/429 |
| 5,828,379 | * 10/1998 | Cok | 345/429 |
| 5,847,712 | * 12/1998 | Salesin et al. | 345/429 |

FOREIGN PATENT DOCUMENTS 0 592 770   7/1993 (EP) .

OTHER PUBLICATIONS

Kazuki Nakashima et al., "A High Speed Contour Fill Method for Character Image Generation", IEICE Transactions on Information and Systems, vol. E77–D, No. 7, Jul. 1, 1994, pp. 832–837.

"*Mitsubishi Display Controller: M64545FP(En–NVGC) Specifications,*" Mitsubishi Denki Kabushiki Kaisha et al., (SOCIO–TECH 545–00–1.00).

"*Procedural Elements for Computer Graphics,*" David F. Forges, Practice Of The Computer Graphics, Basic Procedure And Application, published by The Nikkan Kogyo Shinbun, Ltd.

* cited by examiner

Primary Examiner—Phu K. Nguyen
Assistant Examiner—Cliff N Vo
(74) Attorney, Agent, or Firm—Burns, Doane, Swecker & Mathis, LLP

(57) ABSTRACT

For a polygon without self-intersection, with one of line segments constituting the outline of the polygon selected sequentially in the counterclockwise rotation, all the bits in the right direction of the selected line segment on the horizontal coordinate, inclusive of those for the selected line segment, on the plane work area (1 bit/pixel) of the work memory are inverted to draw (Step S22). Subsequently, only some of the line segments constituting the outline of the polygon whose vectors are in the upward direction (which makes an upward vertical-coordinate variation) are further drawn on the work memory (2A) (Step S23). Finally, the drawing information is transferred with extension from the work memory to the display memory (Step S24). Having the above steps, a method for achieving proper filling of a polygon with a decrease in load on a processor is provided.

20 Claims, 33 Drawing Sheets

|    | H1 | H2 | H3 | H4 | H5 | H6 | H7 | H8 | H9 | H10 | H11 | H12 | H13 | H14 | H15 | H16 |
|----|----|----|----|----|----|----|----|----|----|-----|-----|-----|-----|-----|-----|-----|
| S1 | □  | □  | □  | ■  | □  | □  | □  | □  | □  | □   | □   | □   | □   | □   | □   | □   |
| S2 | □  | □  | ■  | □  | ■  | □  | □  | □  | □  | ■   | □   | □   | □   | □   | □   | □   |
| S3 | □  | ■  | □  | □  | □  | ■  | □  | □  | ■  | □   | ■   | □   | □   | □   | □   | □   |
| S4 | ■  | □  | □  | □  | □  | □  | ■  | □  | ■  | □   | □   | □   | ■   | □   | □   | □   |
| S5 | □  | ■  | □  | □  | □  | □  | □  | ■  | □  | □   | □   | □   | □   | ■   | □   | □   |
| S6 | □  | □  | ■  | □  | □  | ■  | □  | □  | □  | □   | □   | □   | □   | □   | ■   | □   |
| S7 | □  | □  | □  | ■  | □  | ■  | □  | ■  | □  | □   | □   | □   | □   | ■   | □   | □   |
| S8 | □  | □  | □  | ■  | □  | □  | ■  | □  | □  | ■   | □   | □   | ■   | □   | □   | □   |
| S9 | □  | □  | □  | □  | □  | □  | □  | □  | ■  | □   | ■   | □   | □   | □   | □   | □   |
| S10| □  | □  | □  | □  | □  | □  | □  | □  | □  | ■   | □   | □   | □   | □   | □   | □   |

METHOD AND FILLING A POLYGON AND RECORDING MEDIUM

BACKGROUND OF THE INVENTION

1. Field of the Invention

The present invention relates to a method for filling a polygon to be displayed in computer graphics based on the information stored in a display memory.

2. Description of the Background Art

Filling of a polygon in computer graphics has been implemented by using a scan line method and the like in the background art. This is a method in which a polygon is scanned from top to bottom with a horizontal line called a scan line to draw according to the following steps:

1. Take the scan line at the top of a polygon,
2. Repeat the following steps until the scan line reaches the bottom;
   2-1. Obtain sides which intersect the scan line,
   2-2. Obtain points of intersection of the scan line and these sides,
   2-3. Sort the points of intersection according to x-coordinate,
   2-4. Make pairs of two points of intersection in ascending order of x-coordinate and fill the two through,
   2-5. Move to a lower scan line by one,
3. End.

In the step 2-2 of obtaining points of intersection of the scan line and these sides, when a point of intersection is a vertex of a polygon and the vectors of two sides have upward and downward directions, an exceptional process is performed, assuming that there are two points of intersection at the vertex. With respect to an object of FIG. 59, the exceptional process is performed on the points at the coordinates (S1, H4), (S2, H11), (S5, H8), (S6, H7), (S8, H5) and (S10, H11).

For example, when the line segments in the object of FIG. 59 are selected in a counterclockwise rotation as shown in FIG. 60, as the line-segment vector A1 (H4–H8, S1–S5) is in an upward direction (which makes an upward vertical-coordinate variation) and the line-segment vector A2 (H1–H4, S4–S1) is in a downward direction (which makes a downward vertical-coordinate variation), it is assumed that there are two points of intersection at the coordinate (H4, S1) having two sides of the vectors A1 and A2.

On the other hand, another method for filling a polygon is an outline font method, using a drawing work memory of 1 bit/pixel. This is a method in which the bits for the line segments of a polygon and in their right directions are inverted in a work memory (1 bit/pixel) having a minimum rectangular which surrounds an area to be drawn to make a drawing in the area of 1 bit/pixel and the drawing information in the work memory is transferred with extension to a display memory to draw a filled polygon thereon.

In the outline font method, based on outline information defining line segments constituting the outline of a polygon to be filled, selecting a line segment in a predetermined rotation, all the bits for the selected line segment and in its right direction on horizontal coordinate on the work memory are inverted to draw a filled object on the work memory. This process is performed according to the following conditions A) to G):

A) When both a line segment to be now subjected to the bit inversion and a line segment to be next have upward vectors (which makes an upward vertical-coordinate variation), the bits in the right direction of the line segment inclusive of the initial point and not inclusive of the terminal point are inverted.

B) When both a line segment to be now subjected to the bit inversion and a line segment to be next have downward vectors (which makes a downward vertical-coordinate variation), the bits in the right direction of the line segment inclusive of the initial point and not inclusive of the terminal point are inverted.

C) When a line segment to be now subjected to the bit inversion has an upward vector and a line segment to be next has a downward vector, the bits in the right direction of the line segment inclusive of the initial point and the terminal point are inverted.

D) When a line segment to be now subjected to the bit inversion has a downward vector and a line segment to be next has an upward vector, the bits in the right direction of the line segment inclusive of the initial point and the terminal point are inverted.

E) When a line segment to be now subjected to the bit inversion has a downward vector and a line segment to be next has a horizontal vector (which makes no vertical-coordinate variation), the bits in the right direction of the line segment inclusive of the initial point and not inclusive of the terminal point are inverted.

F) When a line segment to be now subjected to the bit inversion has an upward vector and a line segment to be next has a horizontal vector (which makes no vertical-coordinate variation), the bits in the right direction of the line segment inclusive of the initial point and not inclusive of the terminal point are inverted.

G) When a line segment to be now subjected to the bit inversion has a horizontal vector and a line segment to be next has a downward vector, the bits in the right direction of the line segment inclusive of the initial point and not inclusive of the terminal point are inverted.

H) When a line segment to be now subjected to the bit inversion has a horizontal vector and a line segment to be next has an upward vector, the bits in the right direction of the line segment inclusive of the initial point and not inclusive of the terminal point are inverted.

The outline font method will be discussed below, taking a triangle to be filled having the outline shown in FIG. 61 as an example. First, the coordinates of three vertices {P1(H8, S2), P2(H2, S15), P3(H16, S11)} are obtained as the outline information.

With respect to a triangle to be filled, the line-segment vectors L1 (H2–H8, S15–S2), L2 (H16–H2, S11–S15) and L3 (H8–H16, S2–S11) are selected in this order in a counterclockwise rotation as shown in FIG. 62. A plane work area on the work memory is blank (nothing is drawn) in an initial state.

First, the line segment L1 is obtained from the coordinates of the vertices P1 and P2 given as the outline information, using an already-existing linear algorithm such as Bresenham algorithm, as shown in FIGS. 63 and 64, and all the bits in the right direction of the line segment L1 on the horizontal coordinate on the plane work area (1 bit/pixel) of the work memory are inverted for drawing.

FIG. 63 shows a halfway state of the bit inversion of the line segment L1 and FIG. 64 shows the final result of the bit inversion. As the line segment L1 is in the downward direction and the line segment L2 is in the upward direction, according to the condition D), the bits in the right direction of the line segment L1 inclusive of the initial point and the terminal point are inverted.

Secondly, the line segment L2 is obtained from the coordinates of the vertices P2 and P3 given as the outline information, using the already-existing linear algorithm such as Bresenham algorithm, as shown in FIG. 65 and all the bits in the right direction of the line segment L2 on the horizontal coordinate on the plane work area (1 bit/pixel) of the work memory are inverted. As a result, some of the already-drawn bits of FIG. 64 are inverted again to be back in blank.

Figures 65, 66:
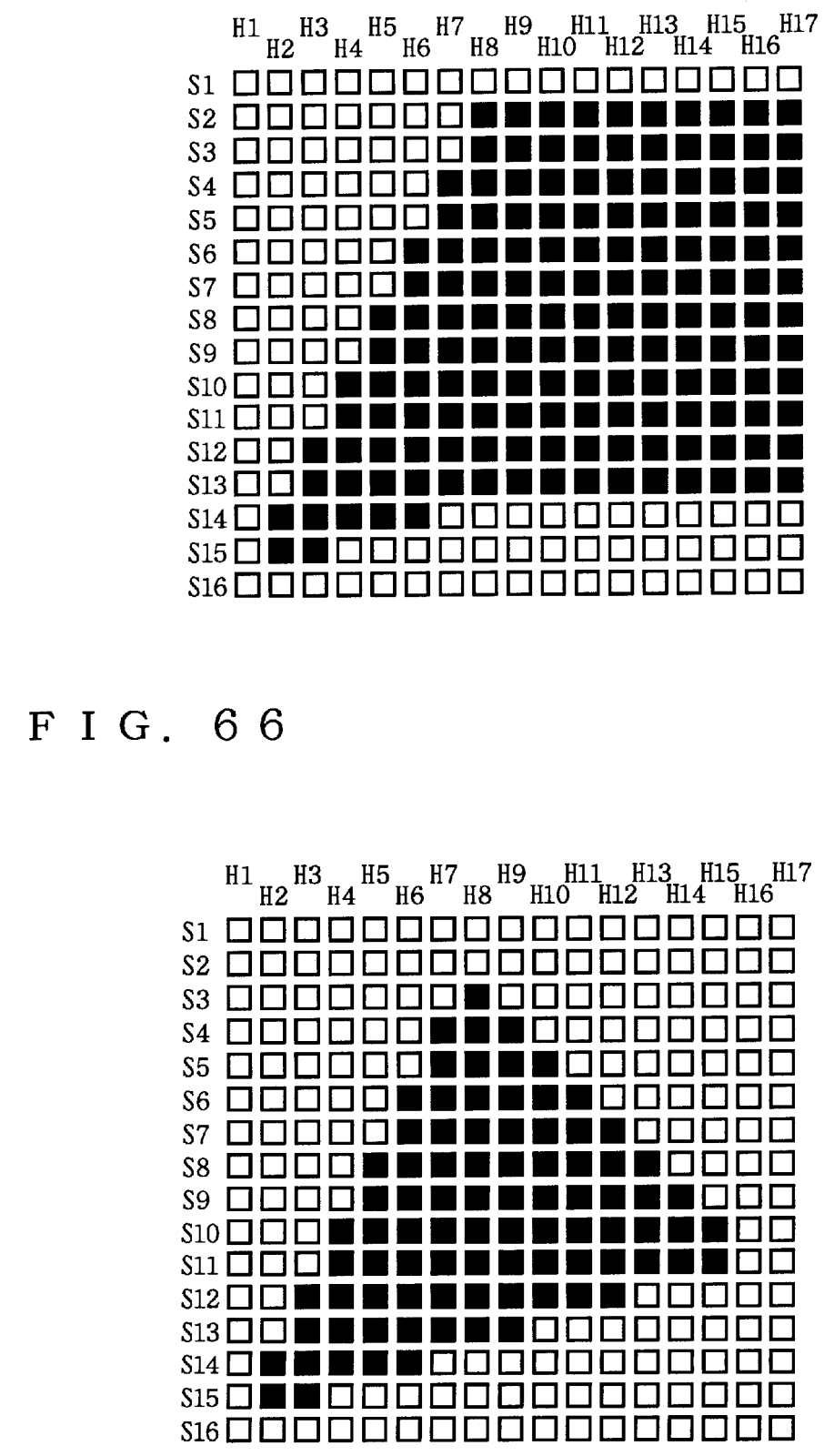

FIG. 65 shows a halfway state of the bit inversion of the line segment L2. As the line segments L2 and L3 are both in the upward direction, according to the condition A), the bits in the right direction of the line segment L2 inclusive of the initial point and not inclusive of the terminal point are inverted.

Similarly, the line segment L3 is obtained from the outline information, and all the bits in the right direction of the line segment L3 on the horizontal coordinate on the plane work area (1 bit/pixel) of the work memory are inverted, to complete the triangle which is filled inside as shown in FIG. 66. As the line segment L3 is in the upward direction and the line segment L1 is in the downward direction, according to the condition C), the bits in the right direction of the line segment L3 inclusive of the initial point and the terminal point are inverted.

After that, the drawing information on the plane work area of the work memory is transferred with extension to a plane display area of the display memory and the triangle which is filled inside is displayed, based on the information stored in the display memory. "Extension" refers to addition of another information such as color information.

Furthermore, in the above outline font method, though the bits in the right direction of each line segment of a polygon are inverted, it is possible, on the same principle, that the bits in the left direction of each line segment of the polygon are inverted.

When it is intended that a large object is drawn through this method, the object is divided into parts so that each of the parts can be processed on the plane work area of the work memory. The divided parts are filled on the respective plane work areas of the work memory and then sequentially transferred to the display memory. That allows filling of a large object even with a work memory having small plane work areas.

The background-art computer graphics adopts the scan line method or the outline font method as discussed above.

The scan line method needs a sort of points of intersection at every raster (scan line) and a relatively large memory to store information on line segments (initial point, terminal point, slope and the like).

As the number of vertices increases, the number of memories increases since memories as much as vertices are needed and also the load on the processor increases with an increase in the number of points of intersection to be sorted.

On the other hand, the outline font method is not likely to have the above disadvantage but has another problem of inaccuracy of filling due to 1-bit (1-pixel) lack on the right side (lack on the left side in a case of the bit inversion in the left direction) of the drawn polygon in drawing a polygon on the 1-bit/pixel plane work area of the work memory according to the conditions A) to H).

SUMMARY OF THE INVENTION

The present invention is directed to a method for filling a polygon, using an image processing system which has a work memory having a rectangular memory area of a plurality of bits, for storing information of one pixel by n ($n \geq 1$) bits and a display memory having a rectangular memory area of a plurality of bits, for storing information of one pixel by m (m>n) bits and displays an image based on the information stored in the display memory, to fill the inside of the polygon. The work memory is blank in an initial state. According to a first aspect of the present invention, the method comprises the steps of: (a) obtaining outline information defining line segments constituting an outline of a polygon to be filled; (b) performing bit inversion to make drawing of filled polygon through inverting all bits in a predetermined horizontal direction on a horizontal coordinate of the work memory corresponding to each of the line segments while selecting each of the line segments constituting the outline of the polygon to be filled in a predetermined rotation based on the outline information; (c) further drawing the line segments constituting the outline of the polygon to be filled on the work memory where the drawing of filled polygon is performed based on the outline information; and (d) transferring information stored in the work memory to the display memory after the step (c).

According to a second aspect of the present invention, in the method of the first aspect, the step (c) includes the step of drawing all the line segments constituting the outline of the polygon to be filled and selected in the predetermined rotation.

According to a third aspect of the present invention, in the method of the first aspect, the polygon to be filled includes a polygon without self-intersection, the bit inversion in the step (b) includes one of a first inversion mode for inverting bits inclusive of those corresponding to the line segments on the work memory and a second inversion mode for inverting bits not inclusive of those corresponding to the line segments, the step (c) includes the step of drawing only some of the line segments constituting the outline of the polygon to be filled and selected in the predetermined rotation whose vectors have a vertical variation in a predetermined vertical direction, and the predetermined vertical direction is determined by the bit inversion, the predetermined rotation and the predetermined horizontal direction, in which some of the line segments which fail to be drawn, lacking, in the bit inversion of the step (b) have a vertical variation.

According to a fourth aspect of the present invention, the method for filling a polygon comprises the steps of: (a) obtaining outline information defining line segments constituting an outline of a polygon without self-intersection to be filled; and (b) performing bit inversion to make drawing of filled polygon through inverting all bits in a predetermined horizontal direction on a horizontal coordinate of the work memory corresponding to each of the line segments while selecting each of the line segments constituting the outline of the polygon to be filled in a predetermined rotation based on the outline information. In the method of the fourth aspect, the bit inversion includes one of a first inversion mode for inverting bits inclusive of those corresponding to the line segments on the work memory and a second inversion mode for inverting bits not inclusive of those corresponding to the line segments. According to the fourth aspect, the method further comprises the steps of; (c) transferring information stored in the work memory to the display memory after the step (b); and (d) drawing only some of the line segments constituting the outline of the polygon to be filled and selected in the predetermined rotation whose vectors have a vertical variation in a predetermined vertical direction on the display memory based on the outline information after the step (c). In the method of the fourth aspect, the predetermined vertical direction is determined by the bit inversion, the predetermined rotation and the predetermined horizontal direction, in which some of the line segments which fail to be drawn, lacking, in the bit inversion of the step (b) have a vertical variation.

According to a fifth aspect of the present invention, in the method of the third or fourth aspect, the bit inversion includes the first inversion mode, the predetermined rotation includes a counterclockwise rotation, the predetermined horizontal direction includes a right direction, and the predetermined vertical direction includes an upward direction.

According to a sixth aspect of the present invention, in the method of the third or fourth aspect, the bit inversion includes the first inversion mode, the predetermined rotation includes a clockwise rotation, the predetermined horizontal direction includes a right direction, and the predetermined vertical direction includes a downward direction.

According to a seventh aspect of the present invention, in the method of the third or fourth aspect, the bit inversion includes the second inversion mode, the predetermined rotation includes a counterclockwise rotation, the predetermined horizontal direction includes a right direction, and the predetermined vertical direction includes a downward direction.

According to an eighth aspect of the present invention, in the method of the third or fourth aspect, the bit inversion includes the second inversion mode, the predetermined rotation includes a clockwise rotation, the predetermined horizontal direction includes a right direction, and the predetermined vertical direction includes an upward direction.

According to a ninth aspect of the present invention, the method for filling a polygon comprises the steps of: (a) obtaining outline information defining line segments constituting an outline of a polygon without self-intersection to be filled; (b) performing bit inversion to make drawing of filled polygon through inverting all bits in a predetermined horizontal direction on a horizontal coordinate of the work memory corresponding to each of the line segments while selecting each of the line segments constituting the outline of the polygon to be filled in a predetermined rotation based on the outline information; (c) transferring information stored in the work memory to the display memory after the step (b). In the method of the ninth aspect, the bit inversion includes a first inversion mode for inverting bits inclusive of those corresponding to the line segments on the work memory and a second inversion mode for inverting bits not inclusive of those corresponding to the line segments, and some of the line segment constituting the outline of the polygon to be filled and selected in the predetermined rotation whose vectors have a vertical variation in a first vertical direction are subjected to the bit inversion in the first inversion mode and some whose vectors have a vertical variation in a second vertical direction are subjected to the bit inversion in the second inversion mode, and the first and second vertical directions is determined by the predetermined rotation and the predetermined horizontal direction so that some of the line segments whose vectors have a vertical variation in the first vertical direction can be drawn with no lack when the bit inversion is performed in the first inversion mode and some of the line segments whose vectors have a vertical variation in the second vertical direction can be drawn with no lack when the bit inversion is performed in the second inversion mode.

According to a tenth aspect of the present invention, in the method of the ninth aspect, the predetermined rotation includes a counterclockwise rotation, the predetermined horizontal direction includes a right direction, the first predetermined vertical direction includes a downward direction, and the second predetermined vertical direction includes an upward direction.

According to an eleventh aspect of the present invention, in the method of the ninth aspect, the predetermined rotation includes a clockwise rotation, the predetermined horizontal direction includes a right direction, the first predetermined vertical direction includes an upward direction, and the second predetermined vertical direction includes a downward direction.

The present invention is also directed to a computer-readable recording medium for recording a program. According to a twelfth aspect of the present invention, the computer-readable recording medium records the method for filling a polygon, using an image processing system which has a work memory having a rectangular memory area of a plurality of bits, for storing information of one pixel by n (n≧1) bits and a display memory having a rectangular memory area of a plurality of bits, for storing information of one pixel by m (m>n) bits and displays an image based on the information stored in the display memory, to fill the inside of the polygon, under a control of a computer. The work memory is blank in an initial state. The recording medium records a program to perform the steps of (a) obtaining outline information defining line segments constituting an outline of a polygon to be filled; (b) performing bit inversion to make drawing of filled polygon through inverting all bits in a predetermined horizontal direction on a horizontal coordinate of the work memory with respect to each of the line segments while selecting each of the line segments constituting the outline of the polygon to be filled in a predetermined rotation based on the outline information; (c) further drawing the line segments constituting the outline of the polygon to be filled on the work memory where the drawing of filled polygon is performed based on the outline information; and (d) transferring information stored in the work memory to the display memory after the step (c).

According to a thirteenth aspect of the present invention, the computer-readable recording medium records the method for filling a polygon, using an image processing system which has a work memory having a rectangular memory area of a plurality of bits, for storing information of one pixel by n (n≧1) bits and a display memory having a rectangular memory area of a plurality of bits, for storing information of one pixel by m (m>n) bits and displays an image based on the information stored in the display memory, to fill the inside of the polygon, under a control of a computer. The work memory is blank in an initial state. The recording medium records a program to perform the steps of (a) obtaining outline information defining line segments constituting an outline of a polygon without self-intersection to be filled; and (b) performing bit inversion to make drawing of filled polygon through inverting all bits in a predetermined horizontal direction on a horizontal coordinate of the work memory with respect to each of the line segments while selecting each of the line segments constituting the outline of the polygon to be filled in a predetermined rotation based on the outline information. In the method, the bit inversion includes one of a first inversion mode for inverting bits inclusive of those for the line segments on the work memory and a second inversion mode for inverting bits not inclusive of those for the line segments. According to the thirteenth aspect, the recording medium records the program to further perform the steps of; (c) transferring information stored in the work memory to the display memory after the step (b); and (d) drawing only some of the line segments constituting the outline of the polygon to be filled and selected in the predetermined rotation whose vectors have a vertical variation in a predetermined vertical direction on the display memory based on the outline information after the step (c). In the method, the predetermined vertical direction depends on the bit inversion, the predetermined rotation and the predetermined horizontal direction, in which some of the line segments which fail to be drawn, lacking, in the bit inversion of the step (b) have a vertical variation.

According to a fourteenth aspect of the present invention, the computerreadable recording medium records the method for filling a polygon, using an image processing system which has a work memory having a rectangular memory area of a plurality of bits, for storing information of one pixel by n (n≧1) bits and a display memory having a rectangular memory area of a plurality of bits, for storing information of one pixel by m (m>n) bits and displays an image based on the information stored in the display memory, to fill the inside of the polygon, under a control of a computer. The work memory is blank in an initial state. The recording medium records a program to perform the steps of (a) obtaining outline information defining line segments constituting an outline of a polygon without self-intersection to be filled; (b) performing bit inversion to make drawing of filled polygon through inverting all bits in a predetermined horizontal direction on a horizontal coordinate of the work memory with respect to each of the line segments while selecting each of the line segments constituting the outline of the polygon to be filled in a predetermined rotation based on the outline information; (c) transferring information stored in the work memory to the display memory after the step (b). In the method, the bit inversion includes a first inversion mode for inverting bits inclusive of those for the line segments on the work memory and a second inversion mode for inverting bits not inclusive of those for the line segments, and some of the line segment constituting the outline of the polygon to be filled and selected in the predetermined rotation whose vectors have a vertical variation in a first vertical direction are subjected to the bit inversion in the first inversion mode and some whose vectors have a vertical variation in a second vertical direction are subjected to the bit inversion in the second inversion mode, and the first and second vertical directions depend on the predetermined rotation and the predetermined horizontal direction so that some of the line segments whose vectors have a vertical variation in the first vertical direction can be drawn with no lack when subjected to the bit inversion in the first inversion mode and some of the line segments whose vectors have a vertical variation in the second vertical direction can be drawn with no lack when subjected to the bit inversion in the second inversion mode.

In accordance with the method for filling a polygon of the first aspect of the present invention, in the step (c), the line segments constituting the outline of the polygon to be filled are further drawn based on the outline information on the work memory where the drawing of filled polygon is performed, and therefore a properly-filled polygon can be obtained even if an incompletely-filled polygon with some of the line segments constituting the outline lacking is drawn in the step (b).

Moreover, as the work memory has smaller number of bits for one pixel than the display memory, performing the step (c) on the work memory reduces the number of memory accesses and suppresses the load on the CPU, thus achieving faster drawing of filled polygon.

In accordance with the method of the second aspect of the present invention, since all the line segments constituting the outline of the polygon to be filled and selected in the predetermined rotation are drawn in the step (c), a properly-filled polygon can be surely obtained from an incompletely-filled polygon with some of the line segments constituting the outline lacking.

In accordance with the method of the third aspect of the present invention, in the step (c), only some of the line segments constituting the outline of the polygon to be filled and selected in the predetermined rotation whose vectors have a vertical variation in the second vertical direction. The second direction is a direction in which some of the line segments which fail to be drawn, lacking, in the bit inversion of the step (b) have a vertical variation.

Therefore, instead of all the line segments constituting the outline of the polygon, only some of the line segments whose vectors are in the second vertical direction, which are needed for proper filling of the polygon, are efficiently drawn in the step (c), and much faster drawing of filled polygon is thereby realized.

In accordance with the method of the fourth aspect of the present invention, in the step (d), only some of the line segments constituting the outline of the polygon to be filled and selected in the predetermined rotation whose vectors have a vertical variation in the second vertical direction. The second direction is a direction in which some of the line segments which fail to be drawn, lacking, in the bit inversion of the step (b) have a vertical variation.

Therefore, instead of all the line segments constituting the outline of the polygon, only some of the line segments whose vectors are in the second vertical direction, which are needed for proper filling of the polygon, are efficiently drawn in the step (d), and much faster drawing of filled polygon is thereby realized.

In accordance with the method of the fifth aspect of the present invention, when the bit inversion is performed in the first inversion mode to invert bits inclusive of those corresponding to the line segments on the work memory, the predetermined rotation is the counterclockwise rotation and the predetermined horizontal direction is the right direction, the second vertical direction is uniquely determined to be the upward direction.

In accordance with the method of the sixth aspect of the present invention, when the bit inversion is performed in the first inversion mode to invert bits inclusive of those corresponding to the line segments on the work memory, the predetermined rotation is the clockwise rotation and the predetermined horizontal direction is the right direction, the second vertical direction is uniquely determined to be the downward direction.

In accordance with the method of the seventh aspect of the present invention, when the bit inversion is performed in the second inversion mode to invert bits not inclusive of those corresponding to the line segments on the work memory, the predetermined rotation is the counterclockwise rotation and the predetermined horizontal direction is the right direction, the second vertical direction is uniquely determined to be the downward direction.

In accordance with the method of the eighth aspect of the present invention, when the bit inversion is performed in the second inversion mode to invert bits not inclusive of those corresponding to the line segments on the work memory, the predetermined rotation is the clockwise rotation and the predetermined horizontal direction is the right direction, the second vertical direction is uniquely determined to be the upward direction.

In accordance with the method of the ninth aspect of the present invention, the bit inversion of the step (b) includes the first inversion mode for inverting bits inclusive of those corresponding to the line segments on the work memory and the second inversion mode for inverting bits not inclusive of those corresponding to the line segments, and some of the line segments constituting the outline of the polygon to be filled and selected in the predetermined rotation whose vectors have a vertical variation in the first vertical direction are subjected to the bit inversion in the first inversion mode and some whose vectors have a vertical variation in the second vertical direction are subjected to the bit inversion in the second inversion mode.

Further, the first and second vertical directions are determined so that some of the line segments whose vectors have a vertical variation in the first vertical direction can be drawn with no lack when the bit inversion is performed in the first inversion mode and some of the line segments whose vectors have a vertical variation in the second vertical direction can be drawn with no lack when the bit inversion is performed in the second inversion mode.

As a result, since a proper filling of the polygon can be achieved by only one operation of the step (b), much faster drawing of filled polygon is realized.

Moreover, as the work memory has smaller number of bits for one pixel than the display memory, performing the step (b) on the work memory reduces the number of memory accesses and suppresses the load on the CPU, thus achieving faster drawing of filled polygon.

In accordance with the method of the tenth aspect of the present invention, when the predetermined rotation is the counterclockwise rotation and the predetermined horizontal direction is the right direction, the first and second vertical directions are uniquely determined to be the downward and upward directions, respectively.

In accordance with the method of the eleventh aspect of the present invention, when the predetermined rotation is the clockwise rotation and the predetermined horizontal direction is the right direction, the first and second vertical directions are uniquely determined to be the upward and downward directions, respectively.

In the step (c) performed in accordance with the program recorded in the recording medium of the twelfth aspect of the present invention, the line segments constituting the outline of the polygon to be filled are further drawn based on the outline information on the work memory where the drawing of filled polygon is performed, and a properly-filled polygon can be therefore obtained even if an incompletely-filled polygon with some of the line segments constituting the outline lacking is drawn in the step (b).

In the step (d) performed in accordance with the program recorded in the recording medium of the thirteenth aspect of the present invention, only some of the line segments constituting the outline of the polygon to be filled and selected in the predetermined rotation whose vectors have a vertical variation in the second vertical direction are drawn. The second direction is a direction in which some of the line segments which fail to be drawn, lacking, in the bit inversion of the step (b) have a vertical variation.

Therefore, instead of all the line segments constituting the outline of the polygon, only some of the line segments whose vectors are in the second vertical direction, which are needed for proper filling of the polygon, are efficiently drawn in the step (c), and much faster drawing of filled polygon is thereby realized.

In the step (b) performed in accordance with the program recorded in the recording medium of the fourteenth aspect of the present invention, the bit inversion includes the first inversion mode for inverting bits inclusive of those corresponding to the line segments on the work memory and the second inversion mode for inverting bits not inclusive of those corresponding to the line segments, and some of the line segment constituting the outline of the polygon to be filled and selected in the predetermined rotation whose vectors have a vertical variation in the first vertical direction are subjected to the bit inversion in the first inversion mode and some whose vectors have a vertical variation in the second vertical direction are subjected to the bit inversion in the second inversion mode.

Further, the first and second vertical directions are determined so that some of the line segments whose vectors have a vertical variation in the first vertical direction can be drawn with no lack when subjected to the bit inversion in the first inversion mode and some of the line segments whose vectors have a vertical variation in the second vertical direction can be drawn with no lack when subjected to the bit inversion in the second inversion mode.

As a result, since a proper filling of the polygon can be achieved by only one operation of the step (b) performed in accordance with the program recorded in the recording medium of the fourteenth aspect, much faster drawing of filled polygon is realized.

Moreover, as the work memory has smaller number of bits for one pixel than the display memory, performing the step (b) on the work memory reduces the number of memory accesses and suppresses the load on the CPU, thus achieving faster drawing of filled polygon.

An object of the present invention is to provide a method for accurate filling of a polygon with a decrease in the load on a processor.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 15 to 19 are illustrations of the method for filling a polygon in accordance with the first preferred embodiment;

FIGS. 20 to 25 are illustrations of the method for filling a polygon in accordance with the second preferred embodiment of the present invention;

FIGS. 26 to 31 are illustrations of the method for filling a polygon in accordance with the third preferred embodiment of the present invention;

FIG. 32 is an illustration of the method for filling a polygon in accordance with the fourth preferred embodiment of the present invention;

FIGS. 34 to 38 are illustrations of the method for filling a polygon in accordance with the fourth preferred embodiment of the present invention;

FIGS. 39 to 44 are illustrations of the method for filling a polygon in accordance with the fifth preferred embodiment of the present invention;

FIGS. 48 and 49 are illustrations of areas to be inverted according to a second inversion mode;

FIGS. 50 to 51 are illustrations of the method for filling a polygon in accordance with the sixth preferred embodiment of the present invention;

FIGS. 52 and 53 are illustrations of the method for filling a polygon in accordance with the seventh preferred embodiment of the present invention;

FIGS. 54 and 55 are illustrations of areas to be inverted according to a second inversion mode;

FIGS. 56 to 58 are illustrations of the method for filling a polygon in accordance with the seventh preferred embodiment of the present invention;

FIGS. 63 to 66 are illustrations of the background-art outline font method.

DESCRIPTION OF THE PREFERRED EMBODIMENTS

<Hardware Construction>

Figure 1:
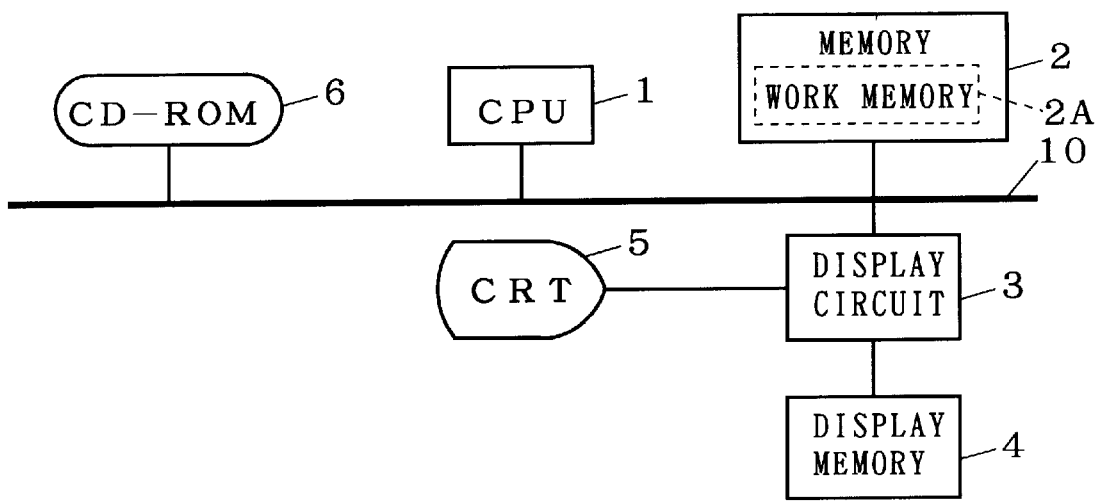
FIG. 1 is a block diagram showing a hardware construction used in all preferred embodiments of the present invention.

FIG. 1 is a block diagram showing a hardware construction of an image processing system used for methods for filling a polygon in accordance with the first to seventh preferred embodiments. As shown in this figure, the image processing system comprises a CPU 1, a memory 2, a display circuit 3, a display memory 4, a CRT 5 and a CD-ROM 6, and the CPU 1, the memory 2, the display circuit 3 and the CD-ROM 6 perform data transfer through a bus 10.

The CPU 1 reads a program recording a process in accordance with the method for filling a polygon as discussed later from the CD-ROM 6. According to the program, the CPU 1 performs filling of a polygon, using a rectangular plane work area of a work memory 2A allocated in the memory 2 and eventually transfers drawing information stored in the work memory 2A of the memory 2 to a rectangular plane display area in the display memory 4 through the bus 10 and the display circuit 3 with extension. The display circuit 3 displays an image on the CRT 5 based on the drawing information stored in the display memory 4.

While the work memory 2A stores information of 1 bit/pixel, the display memory 4 generally stores information of multibit per pixel such as 4 bits/pixel (for 16-color display) and 8 bits/pixel (for 256-color display). Accordingly, it is needed that data of 1 bit/pixel in the work memory 2A should be extended to data of 4 bits/pixel or 8 bits/pixel, with color information added when transferred to the display memory 4.

Then, the CPU 1 transfers the drawing information on the work memory 2A, being extended with another information such as color information added, to the display memory 4. Furthermore, the color information is stored in a predetermined area in the memory 2 or in the display circuit 3.

Figure 2:
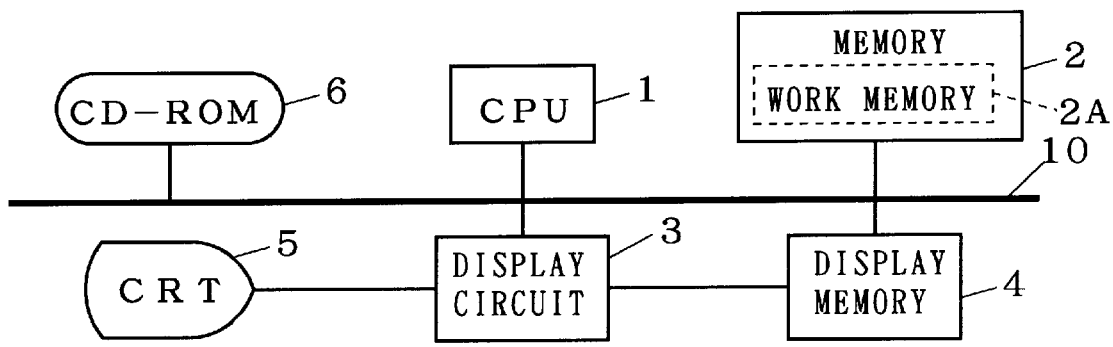
FIGS. 2 to 4 are block diagram showing another hardware constructions.

With construction as shown in FIG. 2, data transfer between the memory 2 and the display memory 4 may be performed through only the bus 10.

Figure 3:
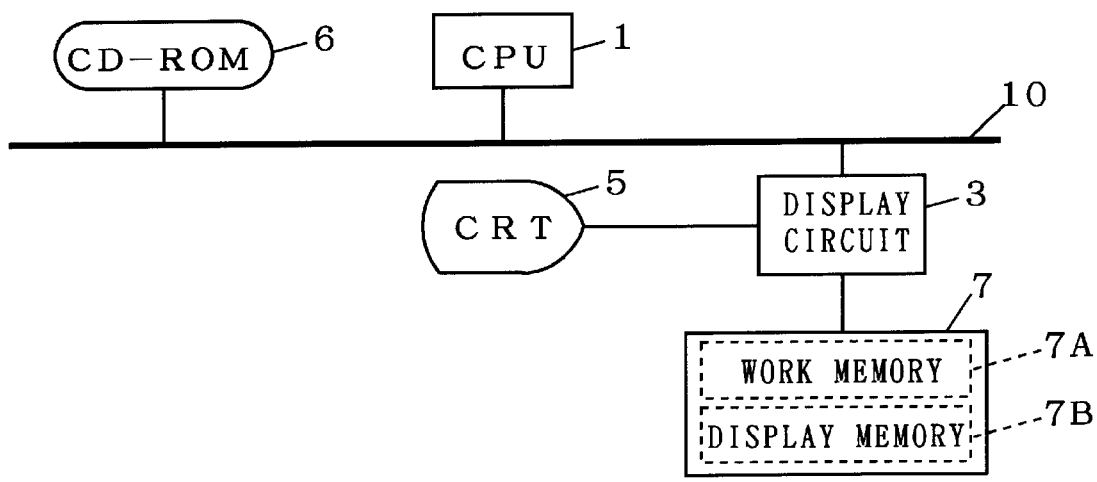
Figure 4:
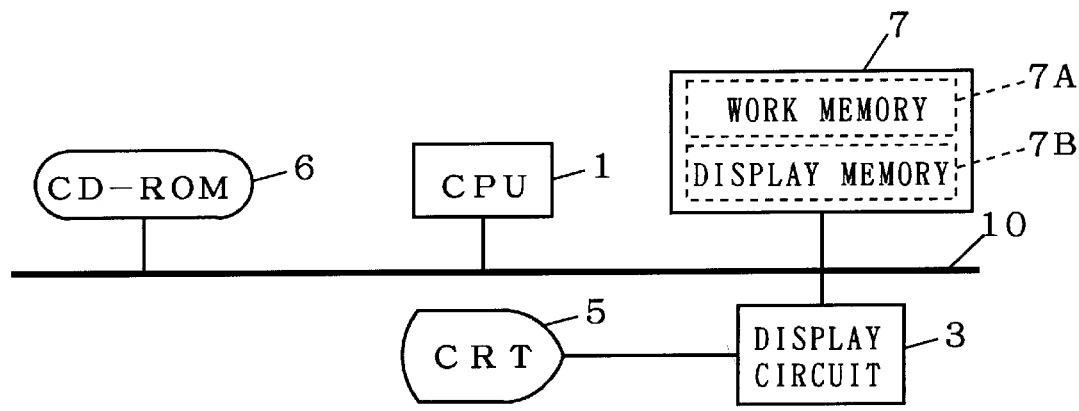

As shown in FIGS. 3 and 4, a work memory 7A and a display memory 7B may be incorporated in a common memory 7. FIG. 3 shows a construction in which the common memory 7 is connected direct to the display circuit 3 and FIG. 4 shows a construction in which the common memory 7 is connected to the bus 10. Further, in the construction of FIG. 3, data transfer with extension from the work memory 7A to the display memory 7B in the common memory 7 may be performed under control of the display circuit 3.

<Principles of The Preferred Embodiments>

In the outline font method using a 1-bit/pixel drawing work memory, the image processing system having one of the constructions of FIGS. 1 to 4 performs the following steps in sequential, to fill a polygon.

[Principle of The First Preferred Embodiment]

Figure 5:
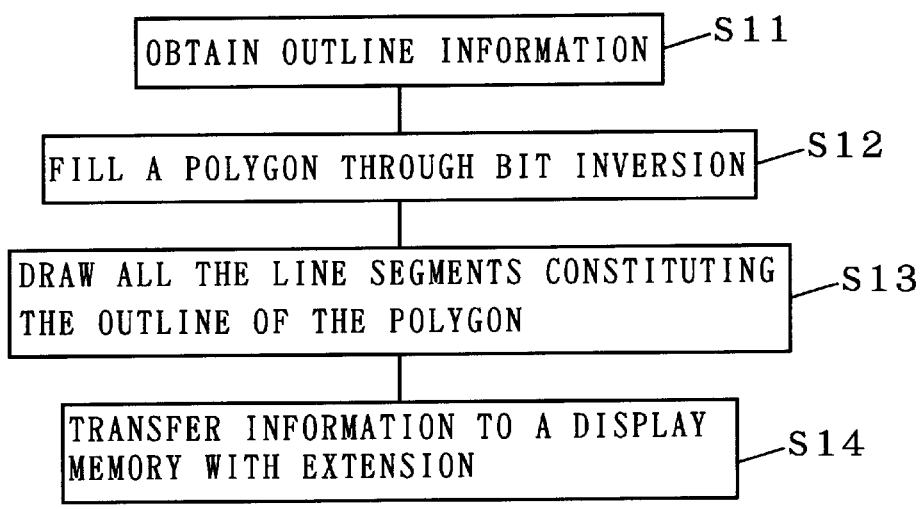
FIG. 5 is a flow chart of process for filling a polygon in accordance with a method of a first preferred embodiment.

As shown in FIG. 5, the following steps are performed: First, the outline information (coordinates of vertices) defining line segments constituting the outline of a polygon to be filled is obtained (Step S11). Then, the bit inversion is performed on the work memory of 1-bit/pixel according to the conditions A) to H), discussed in the background art, to fill the polygon (Step S12). Further, the frame of the polygon (all the line segments constituting the outline) is drawn (Step S13). Finally, the drawing information is transferred with extension from the work memory to the display memory (Step S14).

[Principle of The Second Preferred Embodiment]

Figure 6:
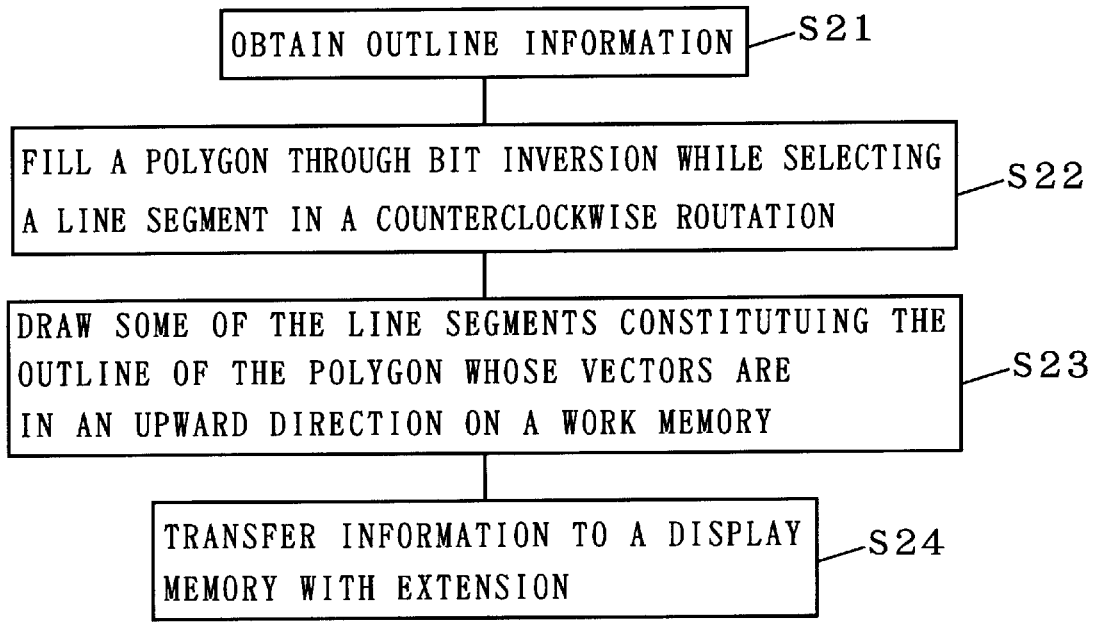
FIG. 6 is a flow chart of process for filling a polygon in accordance with a method of a second preferred embodiment.

As shown in FIG. 6, the following steps are performed: First, the outline information is obtained (Step S21). Then, for a polygon without self-intersection, with one of the line segments selected sequentially in the counterclockwise rotation (in a predetermined rotation), the bit inversion is performed on the work memory of 1-bit/pixel according to the conditions A) to H) to fill the polygon (Step S22). Subsequently, some of the line segments whose vectors are in the upward direction (which makes an upward vertical-coordinate variation; in a predetermined vertical direction) are drawn on the work memory (Step S23). Finally, the drawing information is transferred with extension from the work memory to the display memory (Step S24).

Figure 12:
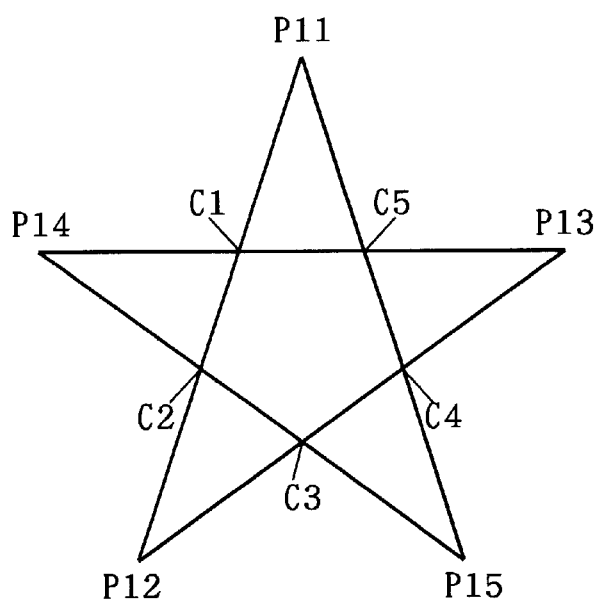
FIG. 12 is an illustration of a polygon with self-intersection.

The polygon without self-intersection refers to a polygon having no point of intersection but the vertices, and does not include a shape such as the star shape of FIG. 12 constituted of vertices P11 to P15 that makes self-intersection with points of intersection C1 to C5.

[Principle of The Third Preferred Embodiment]

Figure 7:
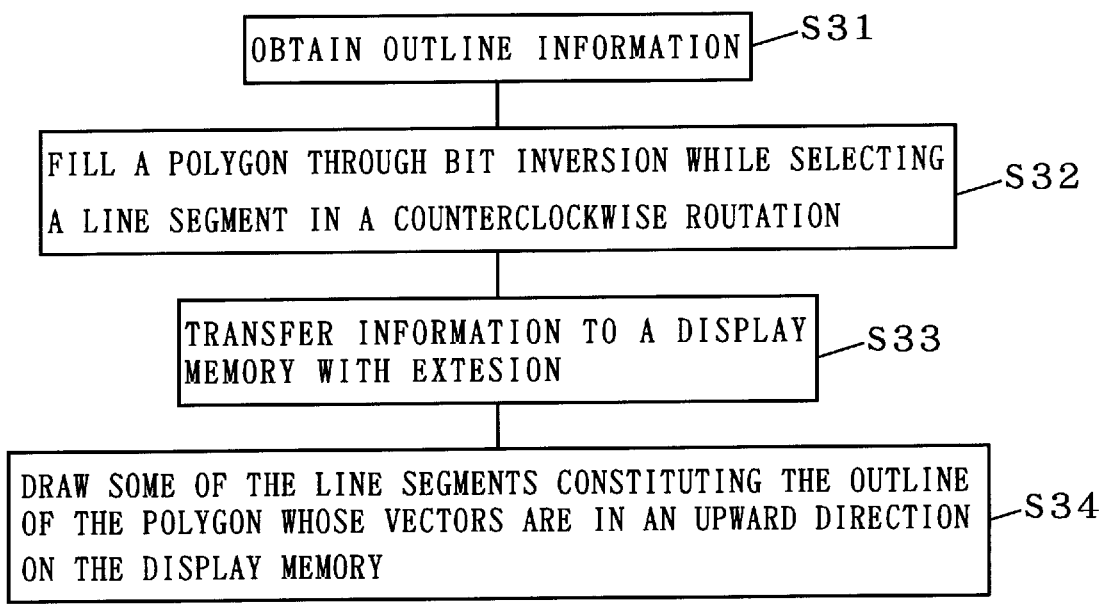
FIG. 7 is a flow chart of process for filling a polygon in accordance with a method of a third preferred embodiment.

As shown in FIG. 7, the following steps are performed: First, the outline information is obtained (Step S31). Then, for a polygon without self-intersection, with one of the line segments selected sequentially in the counterclockwise rotation (in a predetermined rotation), the bit inversion is performed on the work memory of 1-bit/pixel according to the conditions A) to H) to fill the polygon (Step S32). Subsequently, the drawing information is transferred with extension from the work memory to the display memory (Step S33). Finally, some of the line segments whose vectors are in the upward direction (in a predetermined vertical direction) are drawn on the display memory (Step S34).

[Principle of The Fourth Preferred Embodiment]

Figure 8:
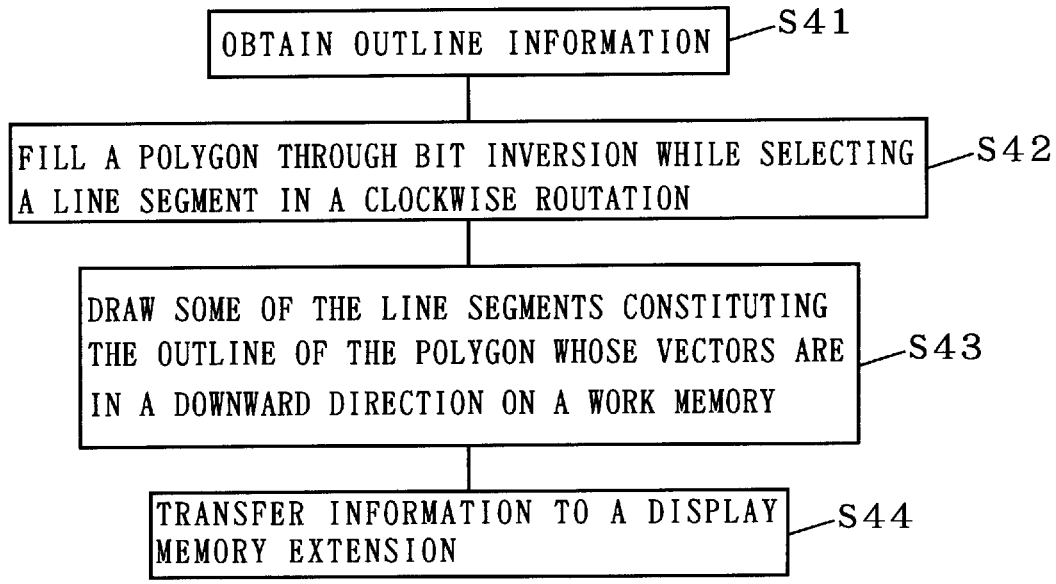
FIG. 8 is a flow chart of process for filling a polygon in accordance with a method of a fourth preferred embodiment.

As shown in FIG. 8, the following steps are performed: First, the outline information is obtained (Step S41). Then, for a polygon without self-intersection, with one of the line segments selected sequentially in the clockwise rotation (in a predetermined rotation), the bit inversion is performed on the work memory of 1-bit/pixel according to the conditions A) to H) to fill the polygon (Step S42). Subsequently, some of the line segments whose vectors are in the downward direction (which makes a downward vertical-coordinate variation; in a predetermined vertical direction) are drawn on the work memory (Step S43). Finally, the drawing information is transferred with extension from the work memory to the display memory (Step S44).

[Principle of The Fifth Preferred Embodiment]

Figure 9:
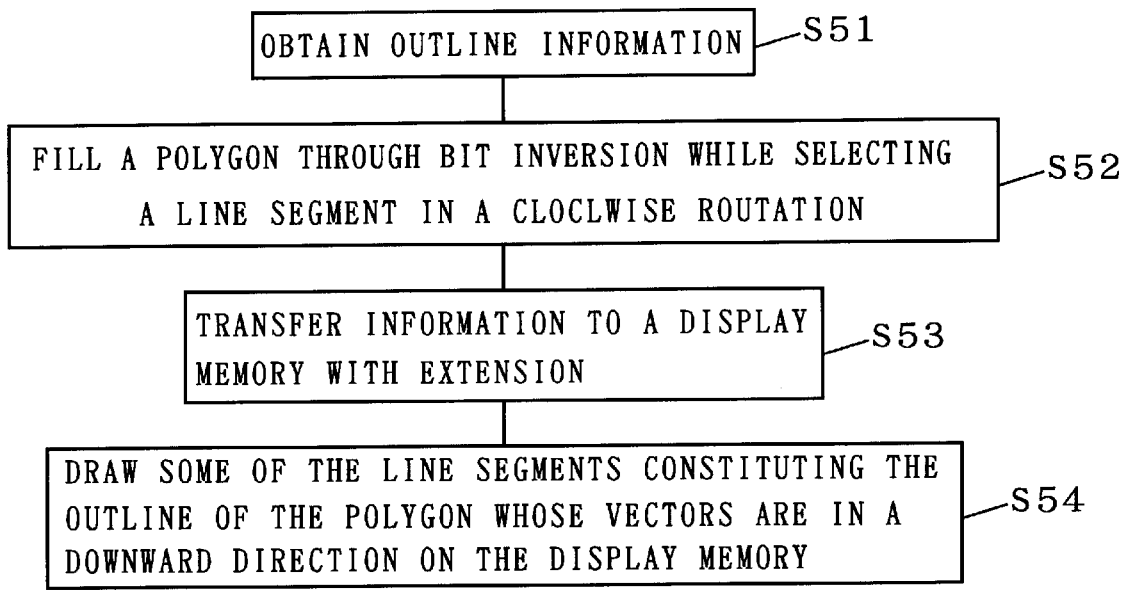
FIG. 9 is a flow chart of process for filling a polygon in accordance with a method of a fifth preferred embodiment.

As shown in FIG. 9, the following steps are performed: First, the outline information is obtained (Step S51). Then, for a polygon without self-intersection, with one of the line segments selected sequentially in the clockwise rotation (in a predetermined rotation), the bit inversion is performed on the work memory of 1-bit/pixel according to the conditions A) to H) to fill the polygon (Step S52). Subsequently, the drawing information is transferred with extension from the work memory to the display memory (Step S53). Finally, some of the line segments whose vectors are in the downward direction (in a predetermined vertical direction) are drawn on the work memory (Step S54).

[Principle of The Sixth Preferred Embodiment]

Figure 10:
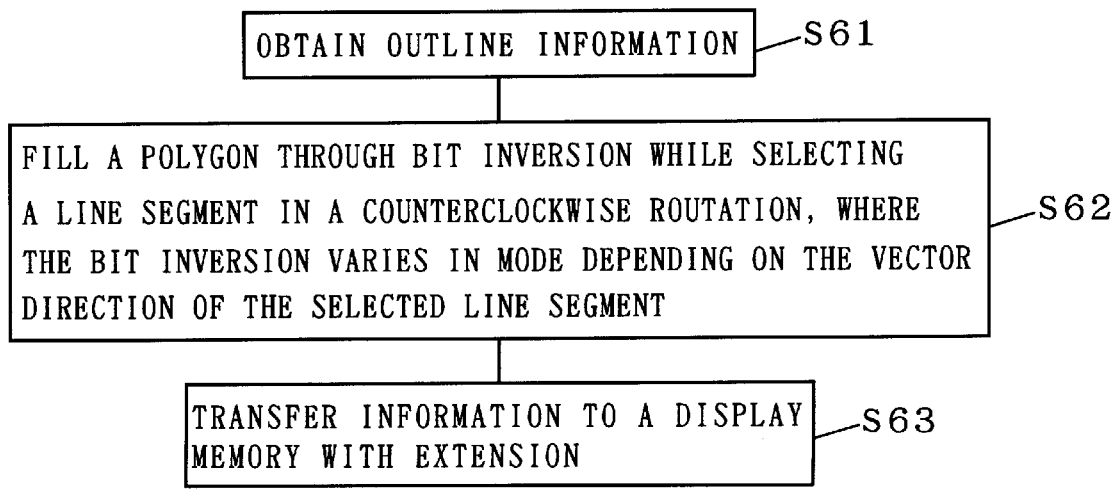
FIG. 10 is a flow chart of process for filling a polygon in accordance with a method of a sixth preferred embodiment.

As shown in FIG. 10, the following steps are performed: First, the outline information is obtained (Step S61). Then, for a polygon without self-intersection, with one of the line segments selected sequentially in the counterclockwise rotation (in a predetermined rotation), the bit inversion is performed on the work memory of 1-bit/pixel according to the conditions A) to H) to fill the polygon (Step S62). In this step, when the vector of a line segment is in the upward direction (in a second vertical direction), the bits not inclusive of those for the line segment are inverted, and when the vector of a line segment is in the other direction (in a first vertical direction), the bits inclusive of those for the line segment are inverted. After that, the drawing information is transferred with extension from the work memory to the display memory (Step S63).

[Principle of The Seventh Preferred Embodiment]

Figure 11:
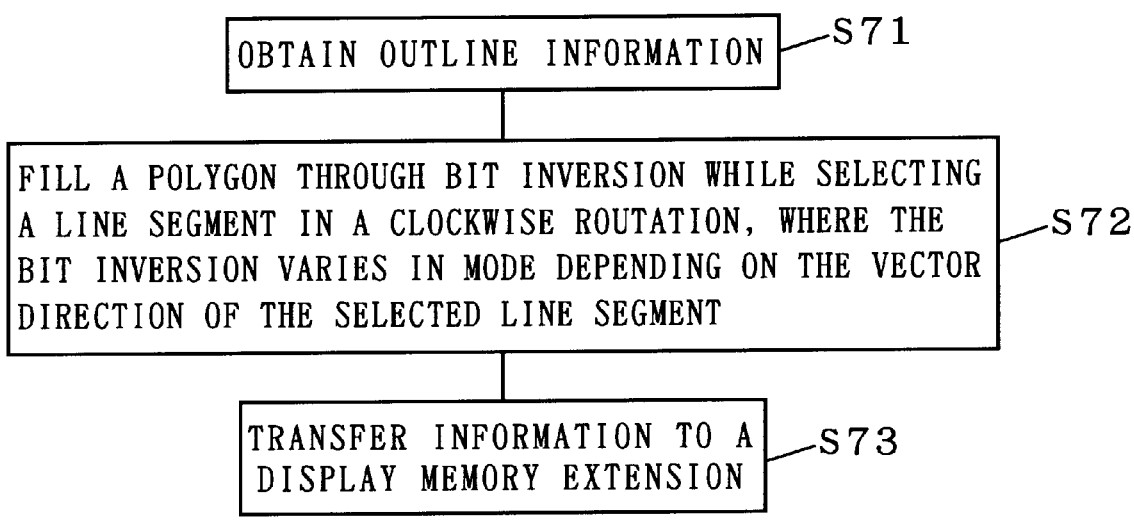
FIG. 11 is a flow chart of process for filling a polygon in accordance with a method of a seventh preferred embodiment.

As shown in FIG. 11, the following steps are performed: First, the outline information is obtained (Step S71). Then, for a polygon without self-intersection, with one of the line segments selected sequentially in the clockwise rotation (in a predetermined rotation), the bit inversion is performed on the work memory of 1-bit/pixel according to the conditions A) to H) to fill the polygon (Step S72). In this step, when the vector of a line segment is in the downward direction (in a second vertical direction), the bits not inclusive of those for the line segment are inverted, and when the vector of a line segment is in the other direction (in a first vertical direction), the bits inclusive of those for the line segment are inverted. After that, the drawing information is transferred with extension from the work memory to the display memory (Step S73).

The First Preferred Embodiment

FIGS. 13 to 19 are illustrations of the method for filling a polygon in accordance with the first preferred embodiment. Any of the hardware constructions of FIGS. 1 to 4 may be used to implement the method for filling a polygon of the first preferred embodiment, and for explanatory convenience, the method using the hardware construction of FIG. 1 will be discussed below.

First, the CPU 1 reads a program recording a process in accordance with the method for filling a polygon of the first preferred embodiment from the CD-ROM 6 through the bus 10.

Figure 13:
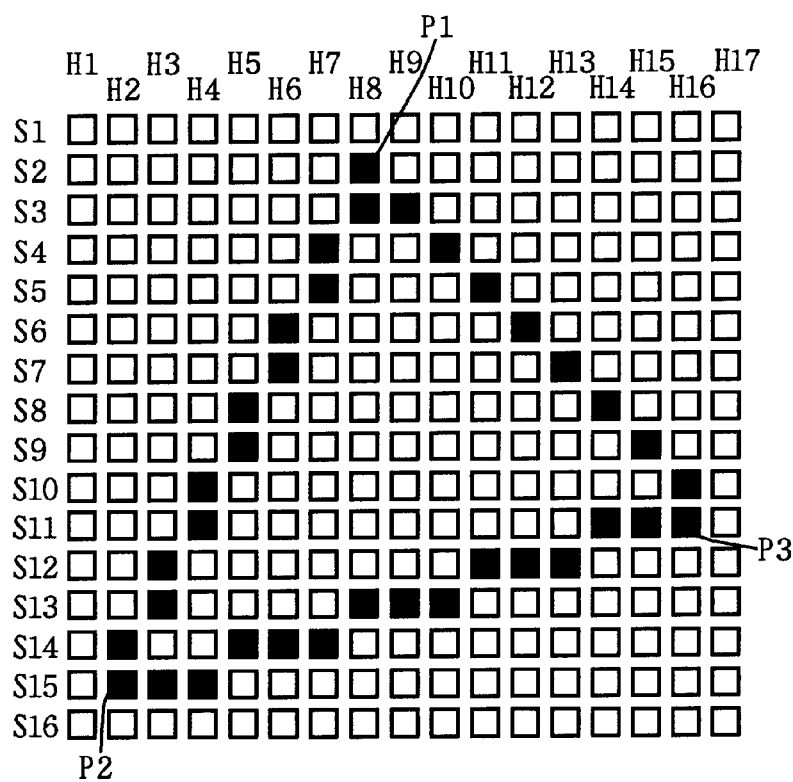
FIG. 13 is an illustration of the method for filling a polygon in accordance with the first preferred embodiment of the present invention.

Then, the coordinates of three vertices {(P1 (H8, S2), P2 (H2, S15), P3 (H16, S11)} are externally obtained as the outline information of the polygon to be filled having the outline of FIG. 13 and are stored in a predetermined area of the memory 2 (Step S11 of FIG. 5). The plane work area of the work memory 2A in the memory 2 is blank (nothing is drawn) in an initial state. Hereinafter, in FIG. 13 illustrating the drawing, a blank square represents a not-drawn state and a solid square represents a drawn state.

Figure 14:
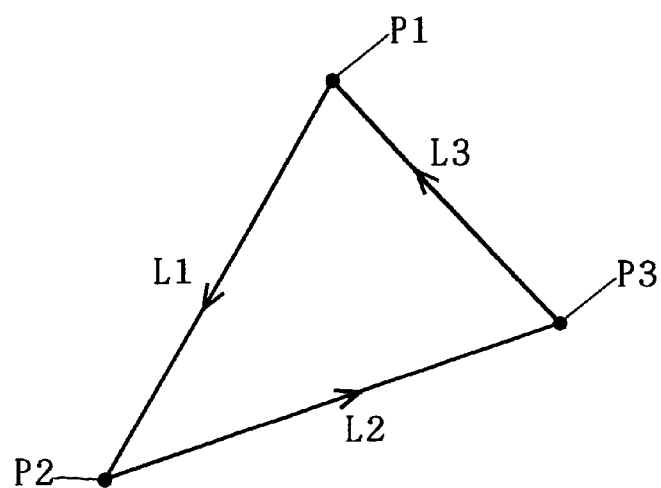
FIG. 14 is a schematic view of the method for filling a polygon in accordance with the first preferred embodiment.

In the method for filling a polygon of the first preferred embodiment, as shown in FIG. 14, for the triangle to be filled, the line segments L1 (H2–H8, S15–S2), L2 (H16–H2, S11–S15), and L3 (H8–H16, S2–S11) are selected in the order of the vertices P1, P2 and P3 in the counterclockwise rotation. The following operation is performed under the control of the CPU 1 based on the program read from the CD-ROM 6.

Figure 15:
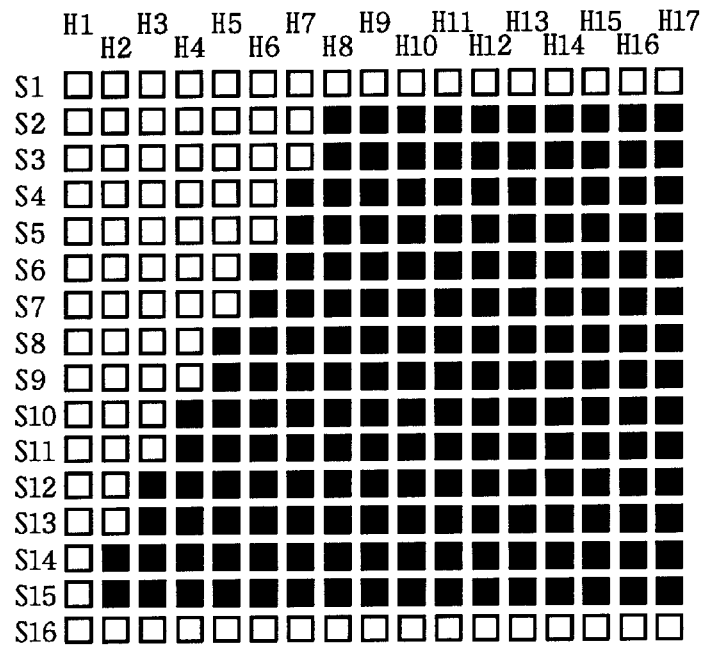
Figure 16:
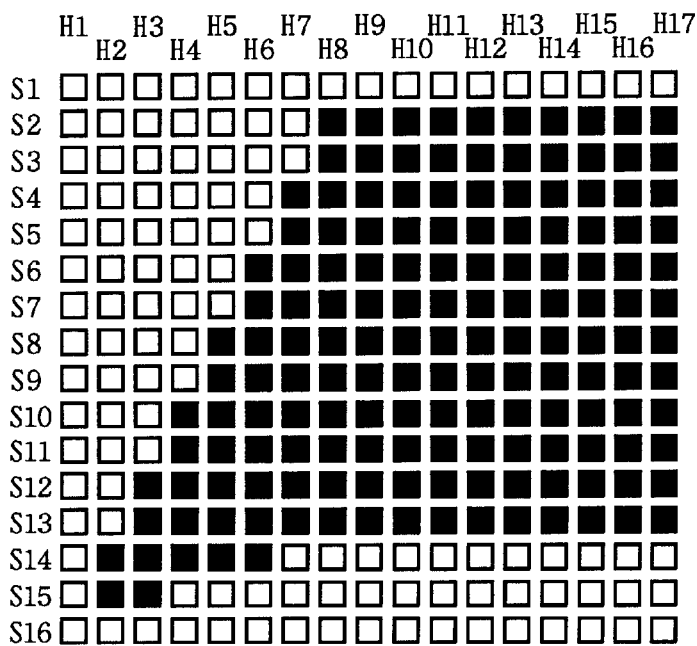
Figures 17, 18:
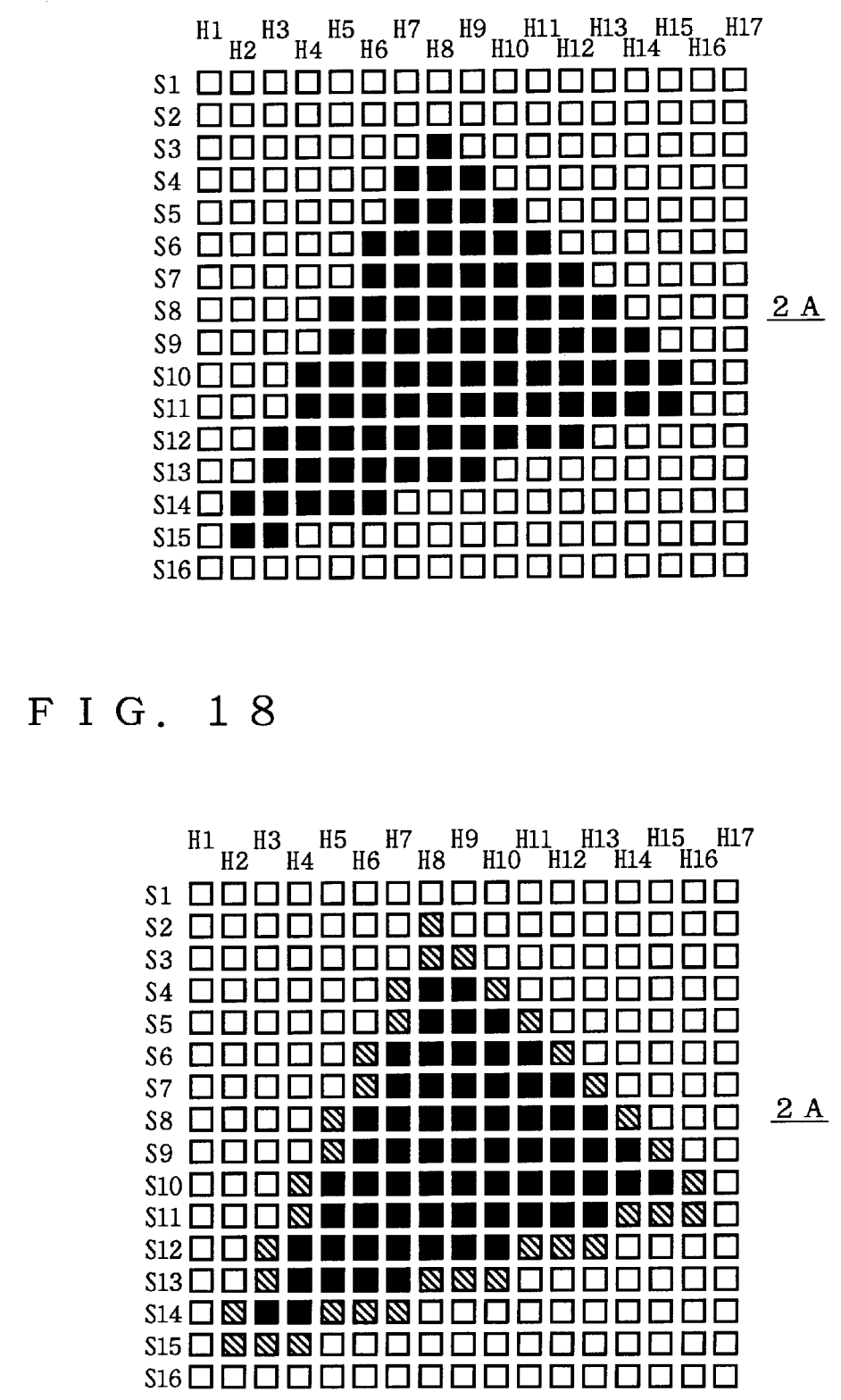

Next, the bit inversion is performed on the work memory 2A as shown in FIGS. 15 to 17 (Step S12 of FIG. 5). The bit inversion will be discussed below.

First, as shown in FIG. 15, the line segment L1 is obtained from the coordinates of the vertices P1 and P2 given as the outline information, using an already-existing linear algorithm such as Bresenham algorithm, and all the bits in the right direction (in a predetermined horizontal direction) of the line segment L1 on the horizontal coordinate, inclusive of those corresponding to the line segment L1, on the plane work area (1 bit/pixel) of the work memory 2A are inverted to draw. As the line segment (vector) L1 is in the downward direction (which makes a downward vertical-coordinate variation) and the line segment (vector) L2 is in the upward direction (which makes an upward vertical-coordinate variation), according to the condition D), the bits in the right direction of the line segment L1 inclusive of the initial point and the terminal point are inverted.

Secondly, as shown in FIG. 16, the line segment L2 is obtained from the coordinates of the vertices P2 and P3 given as the outline information, using the already-existing linear algorithm such as Bresenham algorithm, and all the bits in the right direction of the line segment L2 on the horizontal coordinate, inclusive of those corresponding to the line segment L2, on the plane work area of the work memory 2A are inverted. As a result, some of the already-drawn bits of FIG. 15 are inverted again to be back in blank.

FIG. 16 shows a halfway state of the bit inversion of the line segment L2. As the line segments L2 and L3 are both in the upward direction, according to the condition A), the bits in the right direction of the line segment L2 inclusive of the initial point and not inclusive of the terminal point are inverted.

Similarly, the line segment L3 is obtained based on the outline information, and all the bits in the right direction of the line segment L3 on the horizontal coordinate, inclusive of those corresponding to the line segment L3, on the plane work area of the work memory 2A are inverted. As the line segment L3 is in the upward direction and the line segment L1 is in the downward direction, according to the condition C), the bits in the right direction of the line segment L3 inclusive of the initial point and the terminal point are inverted. As a result, when the bit inversion is completed, the triangle which is filled inside as shown in FIG. 17 is achieved. But, it is an incompletely-filled triangle with some of the line segments on the right side lacking by bit (pixel).

Subsequently, as shown in FIG. 18, the frame of the triangle (represented by hatched squares in FIG. 18) constituted of the line segments L1 to L3 obtained based on the outline information is further drawn on the incompletely-filled triangle on the work memory 2A, to achieve a properly-filled triangle (Step S13 of FIG. 5).

Figures 19, 20:
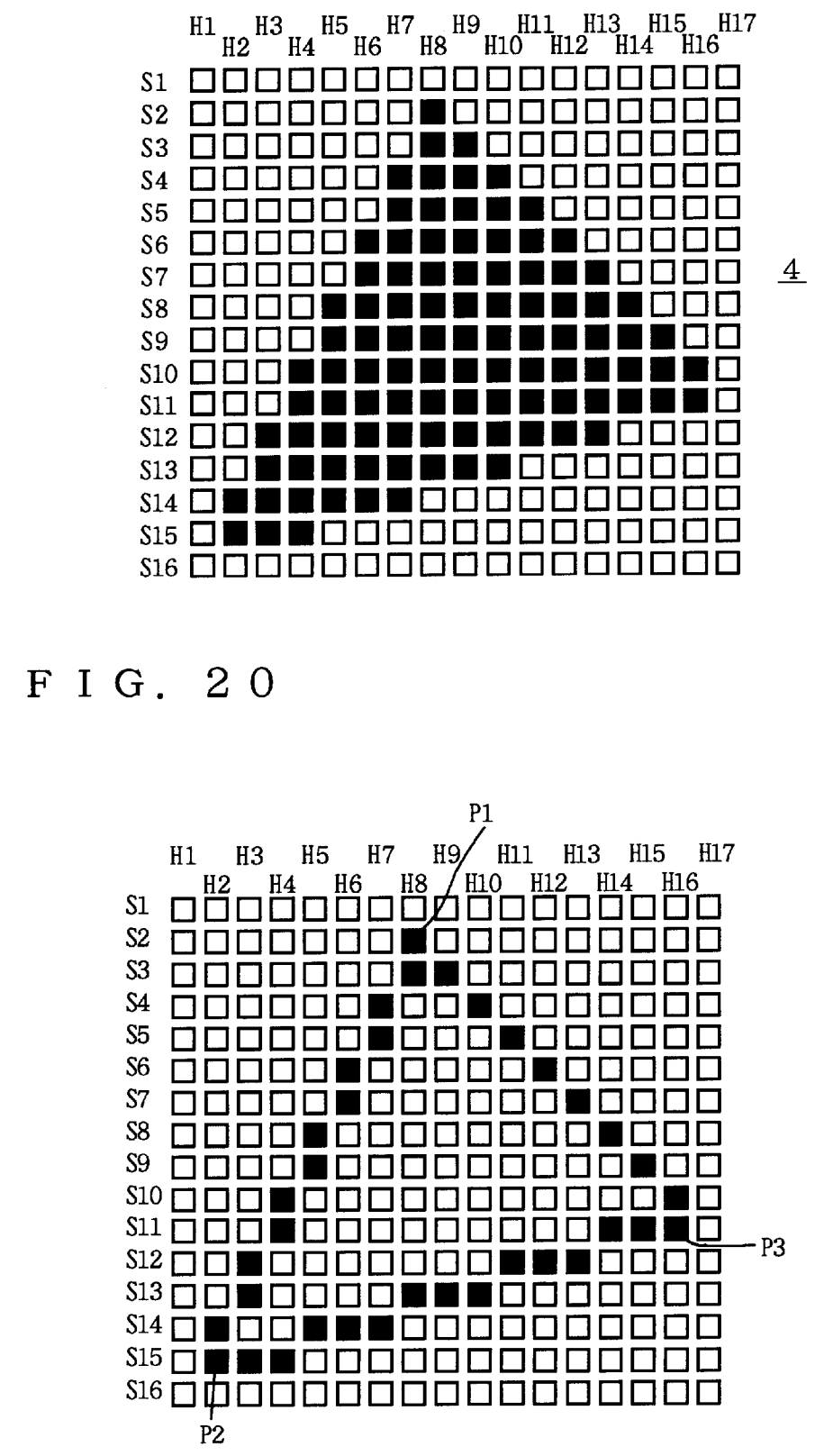

After that, as shown in FIG. 19, the drawing information on the plane work area of the work memory 2A is transferred with extension to the plane display area of the display memory 4 through the bus 10 and the display circuit 3 (Step S14 of FIG. 5).

As a result, the triangle which is properly filled inside is displayed on the CRT 5 by the display circuit 3 based on the information stored in the display memory 4.

Thus, in the method for filling a polygon of the first preferred embodiment, the frame of the polygon is drawn on the work memory where the incompletely-filled polygon is drawn to properly fill the polygon, and then the drawing information is transferred with extension from the work memory to the display memory.

As mentioned earlier, for color display, the number of bits per pixel in the display memory is 4 bits/pixel, 8 bits/pixel or the like, more than that (1 bit/pixel) in the work memory.

As the amount of memories needed for one pixel is smaller in the work memory than in the display memory, drawing the frame of a polygon on the work memory as revealed in the first preferred embodiment reduces the number of memory accesses and suppresses the load on the CPU 1, thus achieving faster drawing of filled polygon.

Though the line segments are selected in the counterclockwise rotation in the above method for filling a polygon of the first preferred embodiment, the line segments may be selected in the clockwise rotation, to produce the same effect. In the first preferred embodiment, since all the line segments constituting the outline of a polygon to be filled and selected in the counterclockwise rotation or the clockwise rotation are drawn, the properly-filled polygon can be surely achieved from the incompletely-filled polygon with some of the line segments constituting the outline lacking which is obtained after the bit inversion.

Further, though the bits inclusive of those for the line segments are inverted in the above method for filling a polygon of the first preferred embodiment, the bits may be inverted non inclusive of those for the line segments.

Furthermore, though the bits in the right direction of the line segments constituting the polygon are inverted in the above method for filling a polygon of the first preferred embodiment, the bits in the left direction of the line segments constituting the polygon may be inverted, based on the same principle. In this case, by drawing the frame of the polygon, the properly-filled polygon can be surely achieved from the incompletely-filled polygon with some of the line segments on the left side lacking by bit (pixel).

The Second Preferred Embodiment

FIGS. 20 to 25 are illustrations of the method for filling a polygon in accordance with the second preferred embodiment. Any of the hardware constructions of FIGS. 1 to 4 may be used to implement the method for filling a polygon of the second preferred embodiment, and for explanatory convenience, the method using the hardware construction of FIG. 1 will be discussed below.

First, the CPU 1 reads a program recording a method for filling a polygon of the second preferred embodiment from the CD-ROM 6 through the bus 10. The method for filling a polygon of the second preferred embodiment is used for processing a polygon without self-intersection.

Then, the coordinates of three vertices {(P1 (H8, S2), P2 (H2, S11), P3 (H16, S11)} are externally obtained as the outline information of the polygon to be filled having the outline of FIG. 20 and are stored in a predetermined area of the memory 2 (Step S21 of FIG. 6). The plane work area of the work memory 2A in the memory 2 is blank in an initial state.

In the method for filling a polygon of the second preferred embodiment, as shown in FIG. 14, for the triangle to be filled, the line segments L1, L2 and L3 are selected in the order of the vertices P1, P2 and P3 in the counterclockwise rotation like in the first preferred embodiment. The following operation is performed under the control of the CPU 1 based on the program read from the CD-ROM 6.

Figure 21:
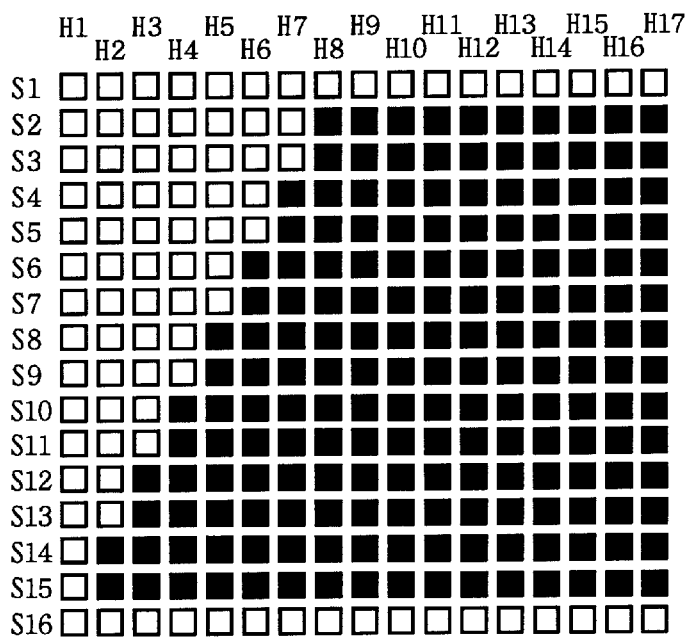
Figure 22:
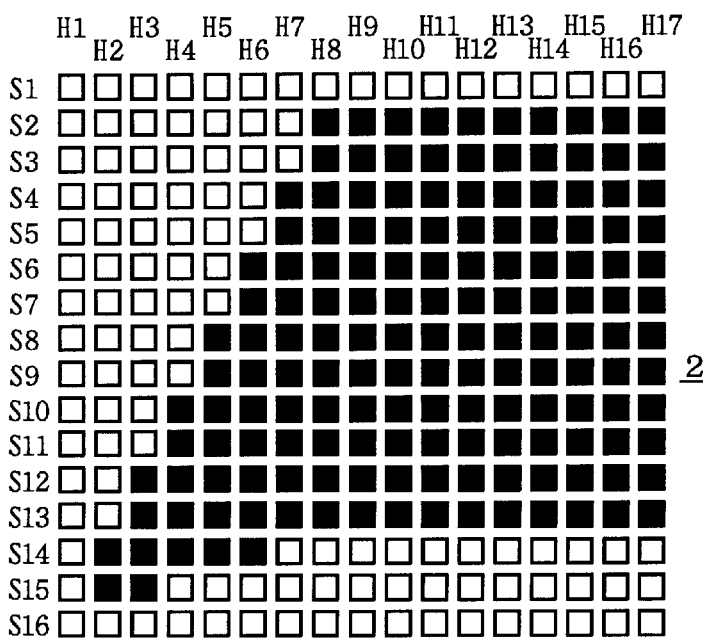
Figures 23, 24:
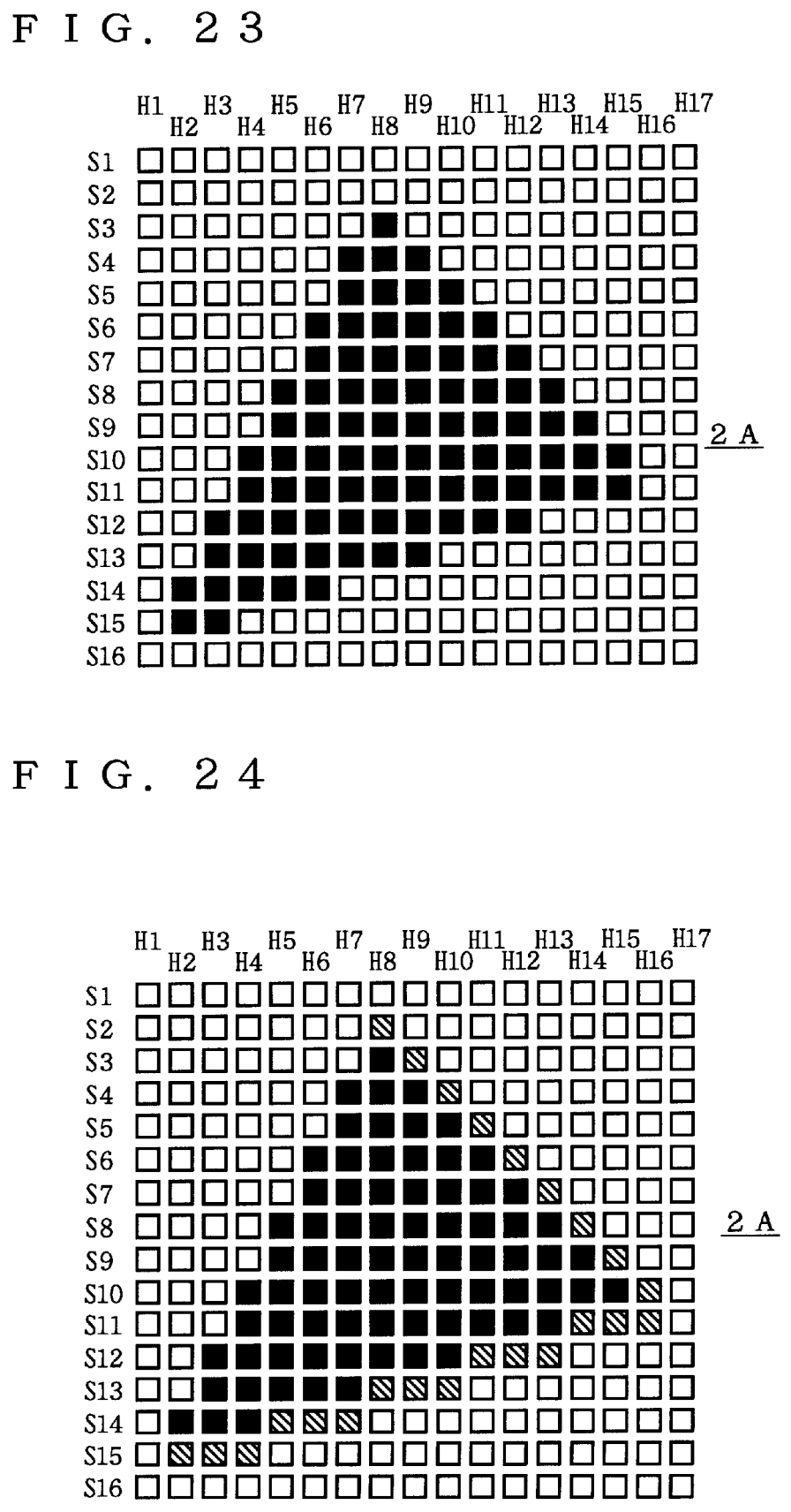

Next, the bit inversion is performed on the work memory 2A as shown in FIGS. 21 to 23 (Step S22 of FIG. 6). The bit inversion will be discussed below.

First, as shown in FIG. 21, the line segment L1 is obtained from the coordinates of the vertices P1 and P2 given as the outline information, using an already-existing linear algorithm such as Bresenham algorithm, and all the bits in the right direction (in a predetermined horizontal direction) of the line segment L1 on the horizontal coordinate, inclusive of those corresponding to the line segment L1, on the plane work area (1 bit/pixel) of the work memory 2A are inverted to draw.

Secondly, as shown in FIG. 22, the line segment L2 is obtained from the coordinates of the vertices P2 and P3 given as the outline information, and all the bits in the right direction of the line segment L2 on the horizontal coordinate, inclusive of those corresponding to the line segment L2, on the plane work area of the work memory 2A are inverted. As a result, some of the already-drawn bits of FIG. 21 are inverted again to be back in blank.

Similarly, the line segment L3 is obtained based on the outline information, and all the bits in the right direction of the line segment L3 on the horizontal coordinate, inclusive of those corresponding to the line segment L3, on the plane work area of the work memory 2A are inverted. As a result, when the bit inversion is completed, the triangle which is filled inside as shown in FIG. 23 is achieved. But, it is an incompletely-filled triangle with some of the line segments on the right side lacking by bit (pixel).

Subsequently, as shown in FIG. 24, only the line segments L2 and L3 (represented by hatched squares in FIG. 24) whose vectors are in the upward direction (which makes an upward vertical-coordinate variation) among the line segments L1 to L3 which are obtained based on the outline information are further drawn on the work memory 2A, to achieve a properly-filled triangle (Step S23 of FIG. 6).

Figures 25, 26:
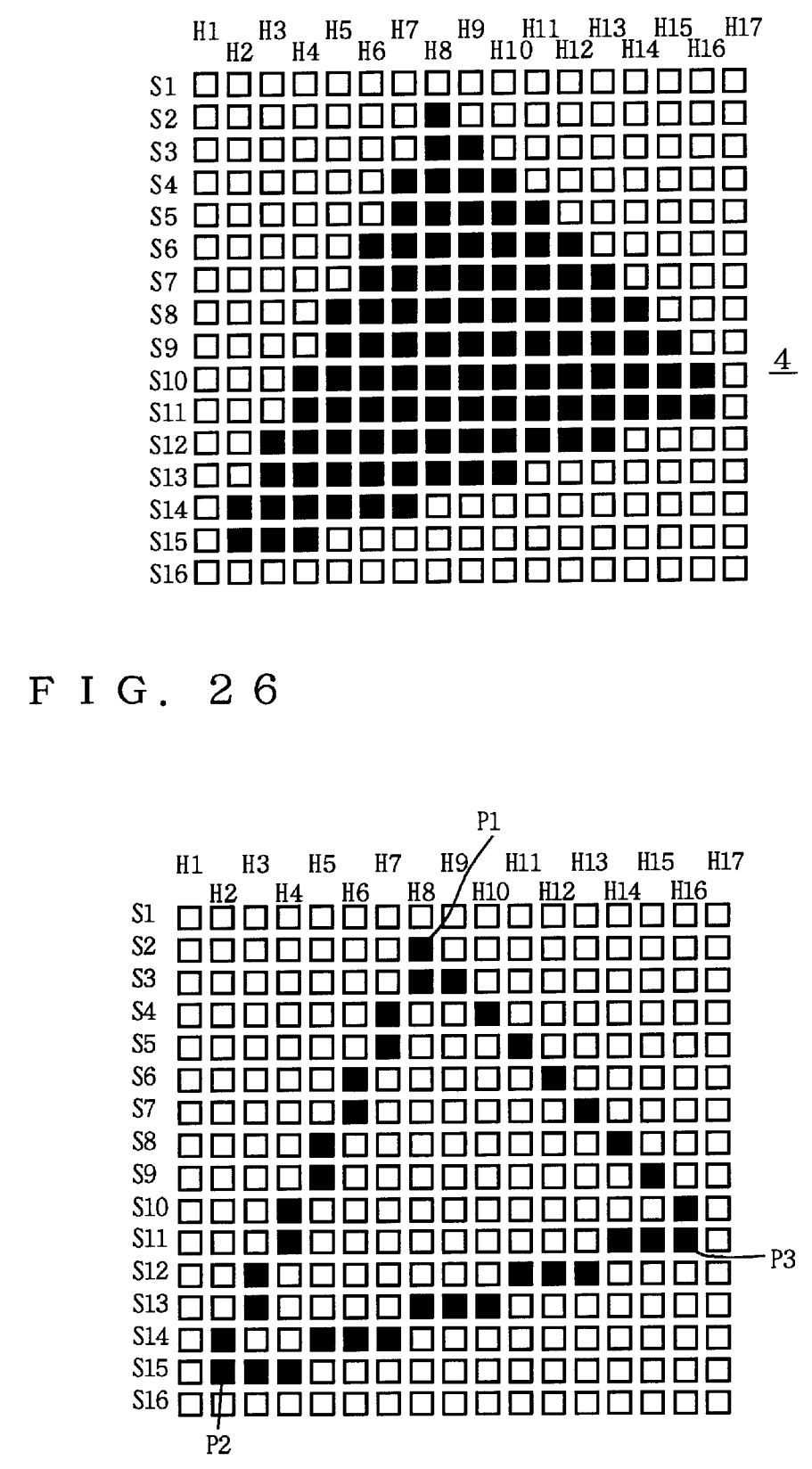

After that, as shown in FIG. 25, the drawing information on the plane work area of the work memory 2A is transferred with extension to the plane display area of the display memory 4 through the bus 10 and the display circuit 3 (Step S24 of FIG. 6).

As a result, the triangle which is properly filled inside is displayed on the CRT 5 by the display circuit 3 based on the information stored in the display memory 4.

Thus, in the method for filling a polygon of the second preferred embodiment, for a polygon without self-intersection, some of the line segments constituting the outline of the polygon whose vector are in the upward direction (which makes an upward vertical-coordinate variation) are further drawn on the work memory where the incompletely-filled polygon is drawn by filling the polygon with one of the line segments constituting the outline of the polygon selected sequentially in the counterclockwise rotation, to properly fill the polygon, and the drawing information is transferred with extension from the work memory to the display memory.

As the amount of memories needed for one pixel is smaller in the work memory than in the display memory, drawing some of the line segments whose vectors are in the upward direction on the work memory as revealed in the second preferred embodiment reduces the number of memory accesses and suppresses the load on the CPU 1, thus achieving faster drawing of filled polygon.

Moreover, instead of all the line segments constituting the polygon, only the line segments on the right side (whose vectors are in the upward direction) of the polygon which are needed for proper filling of the polygon, are efficiently drawn, and much faster drawing of filled polygon is thereby realized.

Further, though the bits inclusive of those for the line segments are inverted (in a first inversion mode) in the above method for filling a polygon of the second preferred embodiment, the bits may be inverted non inclusive of those for the line segments (in a second inversion mode). When the bits non inclusive of those for the line segments are inverted, some of the line segments on the left side of the polygon lack. Therefore, after the bit inversion, only the line segments on the left side (whose vectors are in the downward direction) of the polygon are drawn.

Furthermore, though the bits in the right direction of the line segments constituting the polygon are inverted in the above method for filling a polygon of the second preferred embodiment, the bits in the left direction of the line segments constituting the polygon may be inverted, based on the same principle. In this case, by further drawing the line segments whose vectors are in the downward direction, the properly-filled polygon can be surely achieved from the incompletely-filled polygon with some of the line segments on the left side lacking by bit (pixel).

The Third Preferred Embodiment

FIGS. 26 to 31 are illustrations of the method for filling a polygon in accordance with the third preferred embodiment. Any of the hardware constructions of FIGS. 1 to 4 may be used to implement the method for filling a polygon of the third preferred embodiment, and for explanatory convenience, the method using the hardware construction of FIG. 1 will be discussed below.

First, the CPU 1 reads a program recording a method for filling a polygon of the third preferred embodiment from the CD-ROM 6 through the bus 10. The method for filling a polygon of the third preferred embodiment is used for processing a polygon without self-intersection.

Then, the coordinates of three vertices {(P1 (H8, S2), P2 (H2, S15), P3 (H16, S11)} are externally obtained as the outline information of the polygon to be filled having the outline of FIG. 26 and are stored in a predetermined area of the memory 2 (Step S31 of FIG. 7). The plane work area of the work memory 2A in the memory 2 is blank in an initial state.

In the method for filling a polygon of the third preferred embodiment, as shown in FIG. 14, for the triangle to be filled, the line segments L1, L2 and L3 are selected in the order of the vertices P1, P2 and P3 in the counterclockwise rotation like in the first and second preferred embodiments. The following operation is performed under the control of the CPU 1 based on the program read from the CD-ROM 6.

Figure 27:
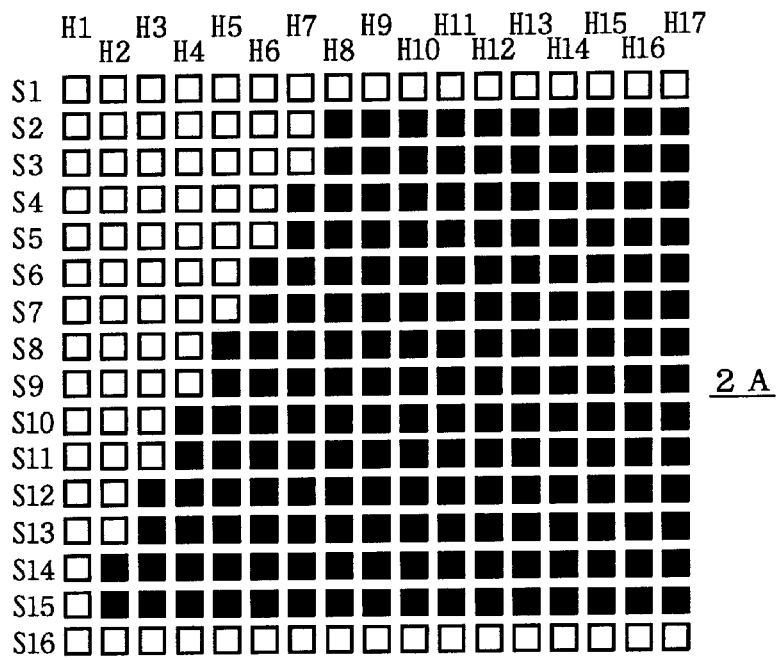
Figure 28:
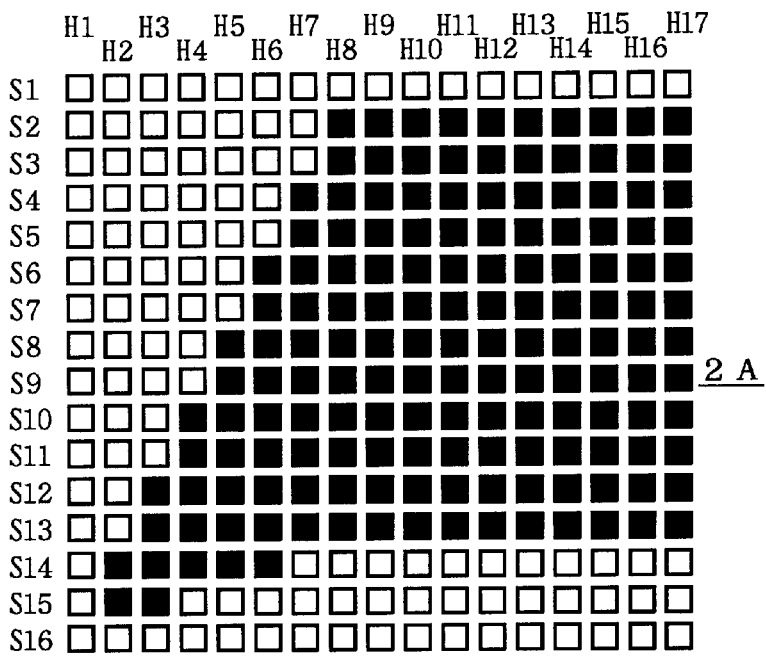
Figures 29, 30:
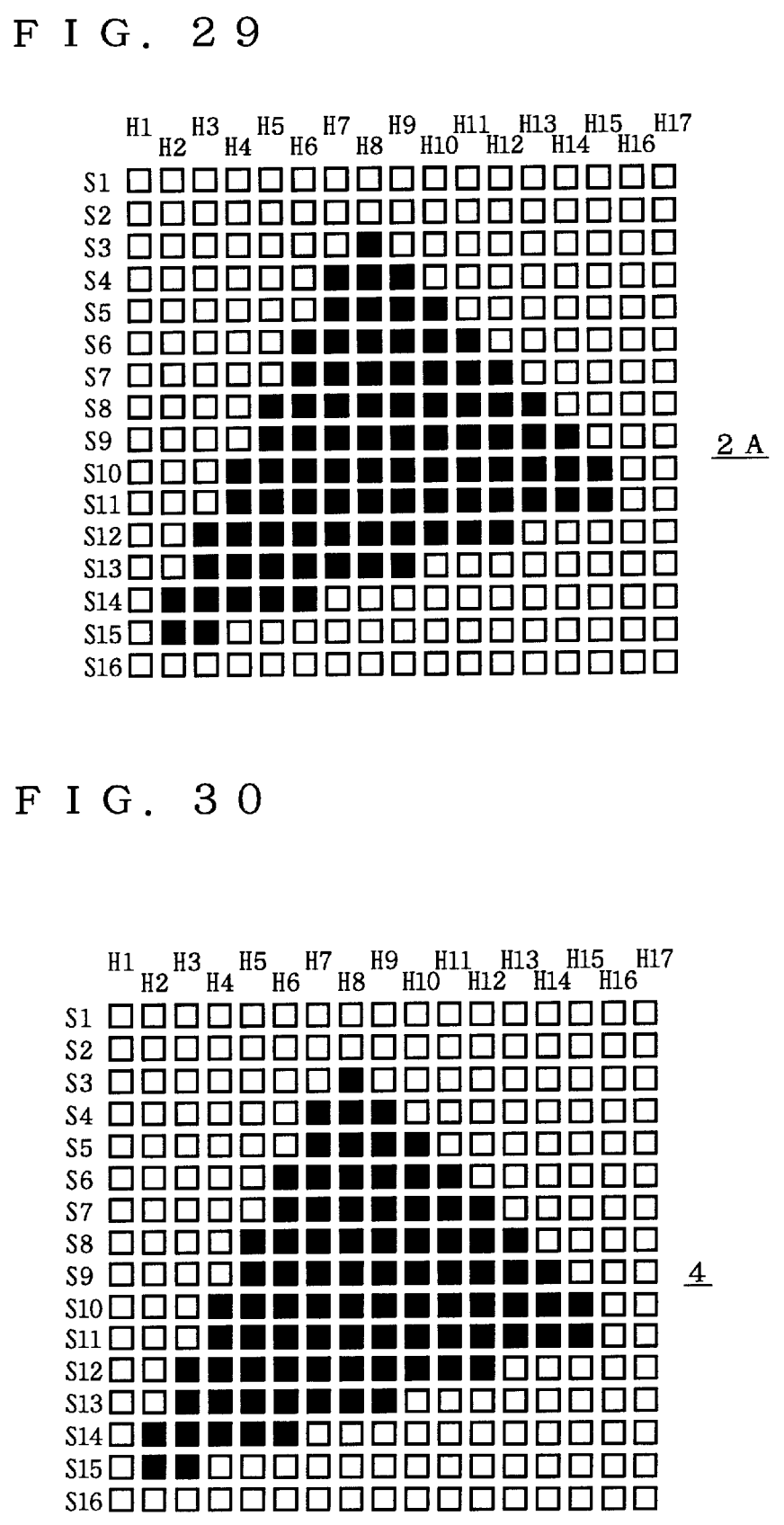

Next, the bit inversion is performed on the work memory 2A as shown in FIGS. 27 to 29 (Step S32 of FIG. 7). The bit inversion will be discussed below.

First, as shown in FIG. 27, the line segment L1 is obtained from the coordinates of the vertices P1 and P2 given as the outline information, using an already-existing linear algorithm such as Bresenham algorithm, and all the bits in the right direction (in a predetermined horizontal direction) of the line segment L1 on the horizontal coordinate, inclusive of those corresponding to the line segment L1, on the plane work area (1 bit/pixel) of the work memory 2A are inverted to draw Secondly, as shown in FIG. 28, the line segment L2 is obtained from the coordinates of the vertices P2 and P3 given as the outline information, and all the bits in the right direction of the line segment L2 on the horizontal coordinate, inclusive of those corresponding to the line segment L2, on the plane work area of the work memory 2A are inverted. As a result, some of the already-drawn bits of FIG. 27 are inverted again to be back in blank.

Similarly, the line segment L3 is obtained based on the outline information, and all the bits in the right direction of the line segment L3 on the horizontal coordinate inclusive of those corresponding to the line segment L3, on the plane work area of the work memory 2A are inverted. As a result, when the bit inversion is completed, the triangle filled inside as shown in FIG. 29 is achieved. But, it is an incompletely-filled triangle with some of the line segments on the right side lacking by bit (pixel).

After that, as shown in FIG. 30, the drawing information on the plane work area of the work memory 2A is transferred with extension to the plane display area of the display memory 4 through the bus 10 and the display circuit 3 (Step S33 of FIG. 7).

Figures 31, 32:
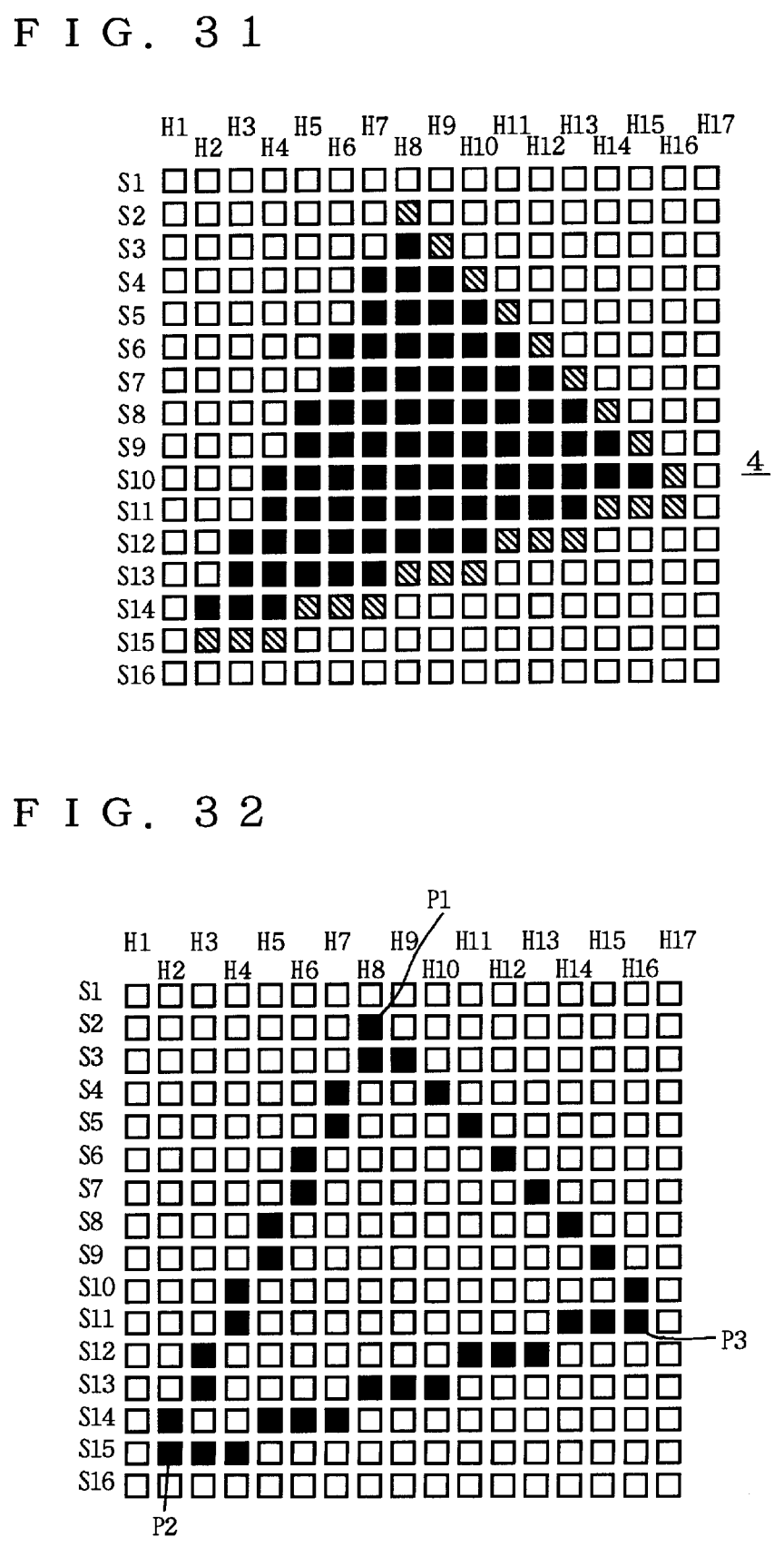

Subsequently, as shown in FIG. 31, only the line segments L2 and L3 (represented by hatched squares in FIG. 31) whose vectors are in the upward direction (which makes an upward vertical-coordinate variation) among the line segments L1 to L3 which are obtained based on the outline information are further drawn on the work memory 2A, to achieve a properly-filled triangle (Step S34 of FIG. 7).

As a result, the triangle which is properly filled inside is displayed on the CRT 5 by the display circuit 3 based on the information stored in the display memory 4.

Thus, in the method for filling a polygon of the third preferred embodiment, for a polygon without self-intersection, some of the line segments constituting the outline of the polygon whose vectors are in the upward direction (which makes an upward vertical-coordinate variation) are further drawn on the display memory 4 where the incompletely-filled polygon is drawn by filling the polygon with one of the line segments constituting the outline of the polygon selected sequentially in the counter-clockwise rotation, to properly fill the polygon.

Therefore, instead of all the line segments constituting the polygon, only the line segments on the right side (whose vectors are in the upward direction) of the polygon which are needed for proper filling of the polygon, are efficiently drawn, and much faster drawing of filled polygon is thereby realized like in the second preferred embodiment.

Further, though the bits inclusive of those for the line segments are inverted (in a first inversion mode) in the above method for filling a polygon of the third preferred embodiment, the bits may be inverted non inclusive of those for the line segments (in a second inversion mode). When the bits non inclusive of those for the line segments are inverted, some of the line segments on the left side of the polygon lack. Therefore, after the bit inversion, only the line segments on the left side (whose vectors are in the downward direction) of the polygon are drawn.

Furthermore, though the bits in the right direction of the line segments constituting the polygon are inverted in the above method for filling a polygon of the third preferred embodiment, the bits in the left direction of the line segments constituting the polygon may be inverted, based on the same principle. In this case, by further drawing the line segments whose vectors are in the downward direction, the properly-filled polygon can be surely achieved from the incompletely-filled polygon with some of the line segments on the left side lacking by bit (pixel).

The Fourth Preferred Embodiment

FIGS. 32 to 38 are illustrations of the method for filling a polygon in accordance with the fourth preferred embodiment. Any of the hardware constructions of FIGS. 1 to 4 may be used to implement the method for filling a polygon of the fourth preferred embodiment, and for explanatory convenience, the method using the hardware construction of FIG. 1 will be discussed below.

First, the CPU 1 reads a program recording a method for filling a polygon of the fourth preferred embodiment from the CD-ROM 6 through the bus 10. The method for filling a polygon of the fourth preferred embodiment is used for processing a polygon without self-intersection.

Then, the coordinates of three vertices {(P1 (H8, S2), P2 (H2, S15), P3 (H16, S11)} are externally obtained as the outline information of the polygon to be filled having the outline of FIG. 32 and are stored in a predetermined area of the memory 2 (Step S41 of FIG. 8). The plane work area of the work memory 2A in the memory 2 is blank in an initial state.

Figure 33:
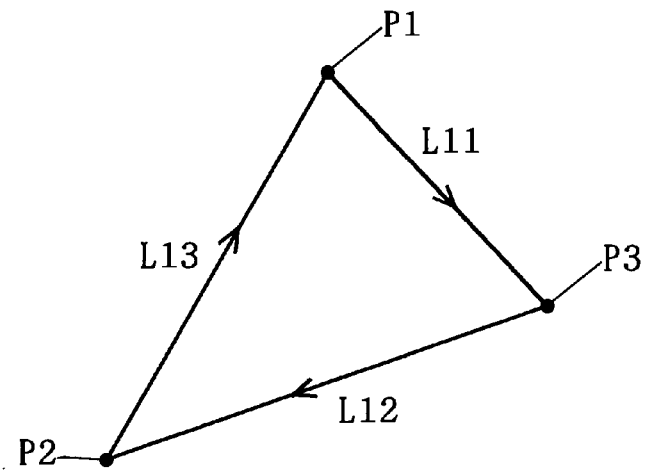
FIG. 33 is a schematic view of the method for filling a polygon in accordance with the fourth preferred embodiment.

In the method for filling a polygon of the fourth preferred embodiment, as shown in FIG. 33, for the triangle to be filled, the line segments L11 (H16–h8, S11–S2), L12 (H2–H16, S15–S11) and L13 (H8–H2, S2–S15) are selected in the order of the vertices P1, P3 and P2 in the clockwise rotation. The following operation is performed under the control of the CPU 1 based on the program read from the CD-ROM 6.

Figure 34:
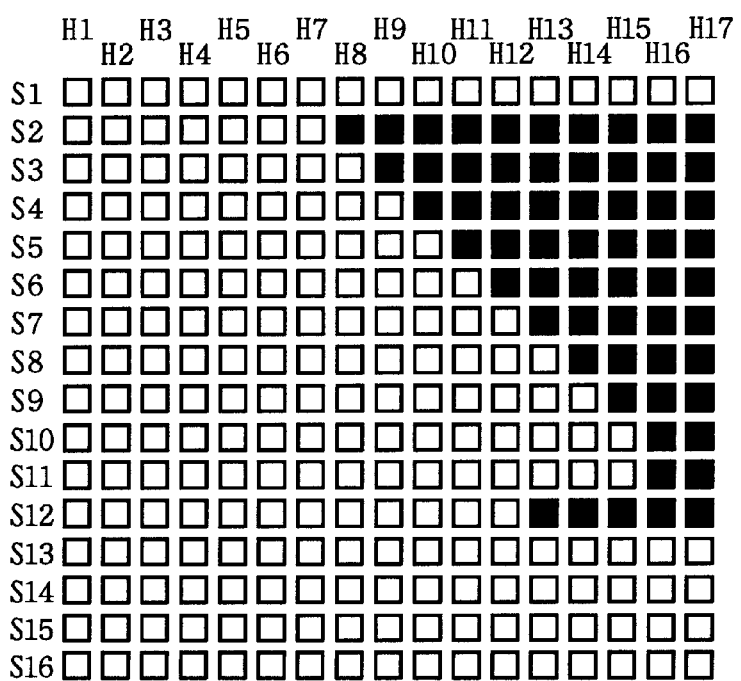
Figures 35, 36:
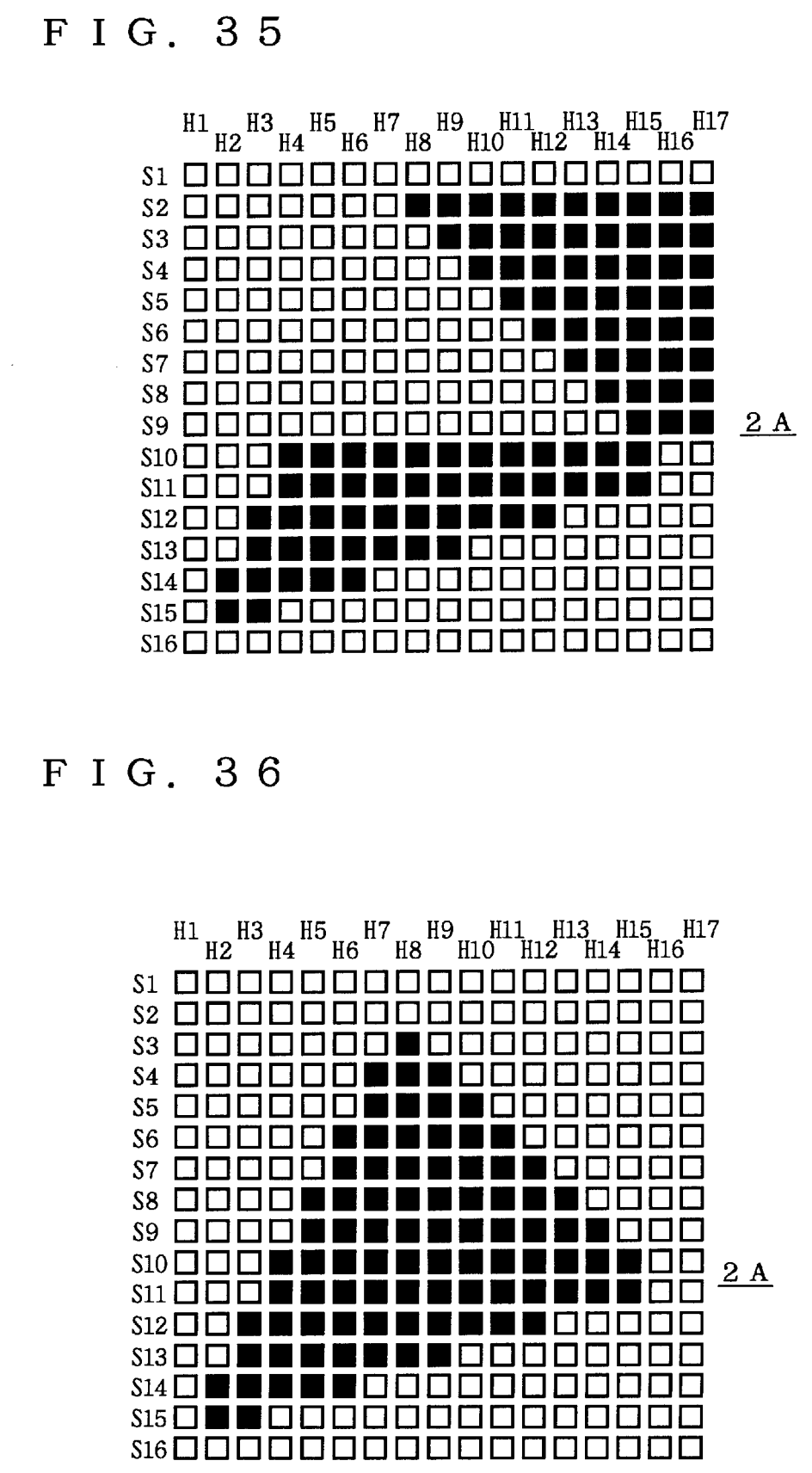

Next, the bit inversion is performed on the work memory 2A as shown in FIGS. 34 to 36 (Step S42 of FIG. 8). The bit inversion will be discussed below. First, as shown in FIG. 34, the line segment L11 is obtained from the coordinates of the vertices P1 and P3 given as the outline information, using an already-existing linear algorithm such as Bresenham algorithm, and all the bits in the right direction (in a predetermined horizontal direction) of the line segment L11 on the horizontal coordinate, inclusive of those corresponding to the line segment L11, on the plane work area (1 bit/pixel) of the work memory 2A are inverted to draw. FIG. 34 shows a halfway state of the bit inversion of the line segment L11.

Secondly, the line segment L12 is obtained from the coordinates of the vertices P2 and P3 given as the outline information and all the bits in the right direction of the line segment L12 on the horizontal coordinate, inclusive of those corresponding to the line segment L12, on the plane work area of the work memory 2A are inverted.

Similarly, as shown in FIG. 35, the line segment L13 is obtained based on the outline information, and all the bits in the right direction of the line segment L13 on the horizontal coordinate, inclusive of those corresponding to the line segment L13, on the plane work area of the work memory 2A are inverted. At this time, some of the bits which are already drawn by the bit inversion based on the line segments L11 and L12 are inverted again to be back in blank. FIG. 35 shows a halfway state of the bit inversion of the line segment L13.

When the bit inversion is completed, the triangle which is filled inside as shown in FIG. 36 is achieved. But, it is an incompletely-filled triangle with some of the line segments on the right side lacking by bit (pixel).

Figure 37:
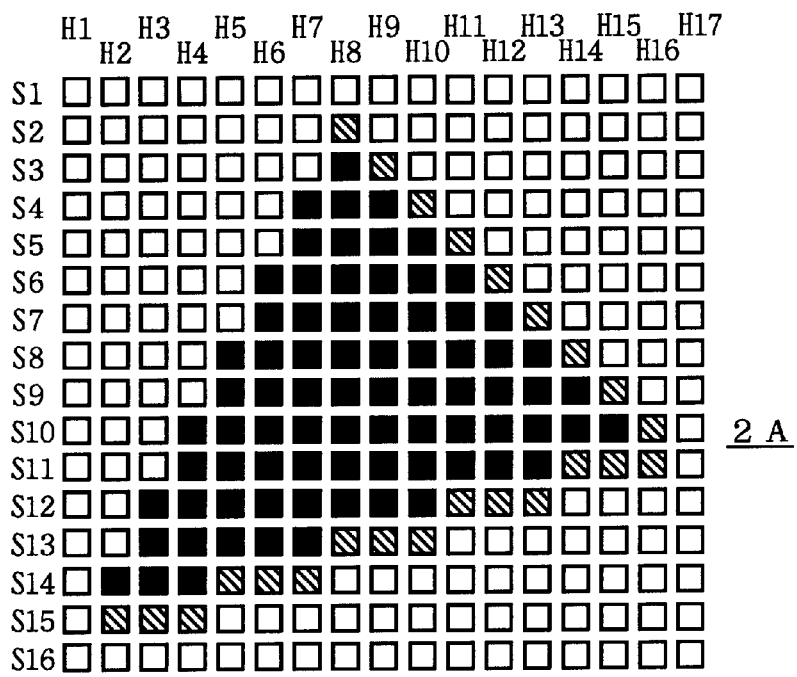

Subsequently, as shown in FIG. 37, only the line segments L11 and L12 (represented by hatched squares in FIG. 37) whose vectors are in the downward direction (which makes a downward vertical-coordinate variation) among the line segments L11 to L13 which are obtained based on the outline information are further drawn on the work memory 2A, to achieve a properly-filled triangle (Step S43 of FIG. 8).

Figure 38:
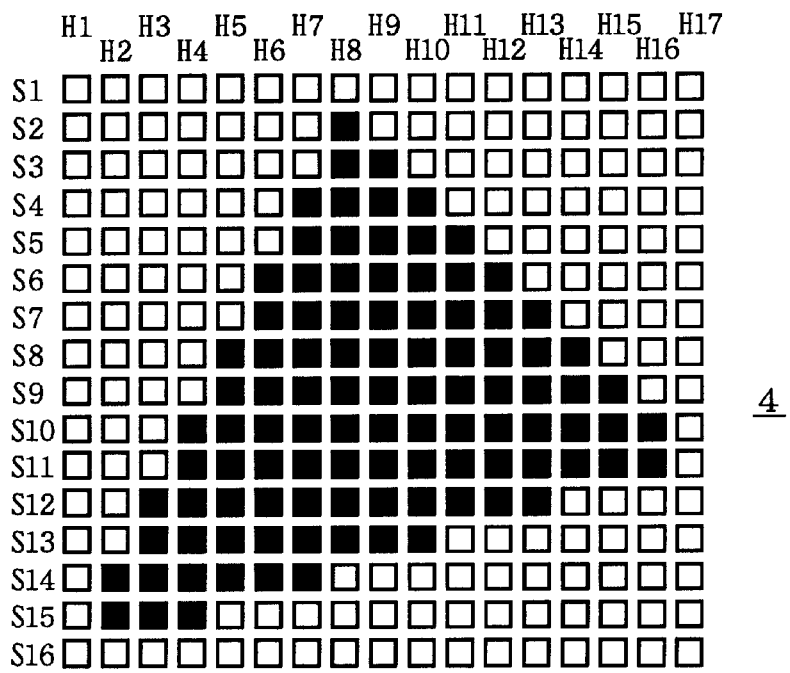

After that, as shown in FIG. 38, the drawing information on the plane work area of the work memory 2A is transferred with extension to the plane display area of the display memory 4 through the bus 10 and the display circuit 3 (Step S44 of FIG. 8).

As a result, the triangle which is properly filled inside is displayed on the CRT 5 by the display circuit 3 based on the information stored in the display memory 4.

Thus, in the method for filling a polygon of the fourth preferred embodiment, for a polygon without self-intersection, some of the line segments constituting the outline of the polygon whose vectors are in the downward direction (which makes a downward vertical-coordinate variation) are further drawn on the work memory where the incompletely-filled polygon is drawn by filling the polygon with one of the line segments constituting the outline of the polygon selected sequentially in the clockwise rotation, to properly fill the polygon, and the drawing information is transferred with extension from the work memory to the display memory.

As the amount of memories needed for one pixel is smaller in the work memory than in the display memory, drawing some of the line segments whose vectors are in the downward direction on the work memory as revealed in the fourth preferred embodiment reduces the number of memory accesses and suppresses the load on the CPU 1, thus achieving faster drawing of filled polygon.

Moreover, instead of all the line segments constituting the polygon, only the line segments on the right side (whose vectors are in the downward direction) of the polygon which are needed for proper filling of the polygon, are efficiently drawn, and much faster drawing of filled polygon is thereby realized.

Further, though the bits inclusive of those for the line segments are inverted (in a first inversion mode) in the above method for filling a polygon of the fourth preferred embodiment, the bits may be inverted non inclusive of those for the line segments (in a second inversion mode). When the bits non inclusive of those for the line segments are inverted, some of the line segments on the left side of the polygon lack. Therefore, after the bit inversion, only the line segments on the left side (whose vectors are in the upward direction) of the polygon are drawn.

Furthermore, though the bits in the right direction of the line segments constituting the polygon are inverted in the above method for filling a polygon of the fourth preferred embodiment, the bits in the left direction of the line segments constituting the polygon may be inverted, based on the same principle. In this case, by further drawing the line segments whose vectors are in the upward direction, the properly-filled polygon can be surely achieved from the incompletely-filled polygon with some of the line segments on the left side lacking by bit (pixel).

The Fifth Preferred Embodiment

FIGS. 39 to 44 are illustrations of the method for filling a polygon in accordance with the fifth preferred embodiment. Any of the hardware constructions of FIGS. 1 to 4 may be used to implement the method for filling a polygon of the fifth preferred embodiment, and for explanatory convenience, the method using the hardware construction of FIG. 1 will be discussed below.

First, the CPU 1 reads a program recording a method for filling a polygon of the fifth preferred embodiment from the CD-ROM 6 through the bus 10. The method for filling a polygon of the fifth preferred embodiment is used for processing a polygon without self-intersection.

Figure 39:
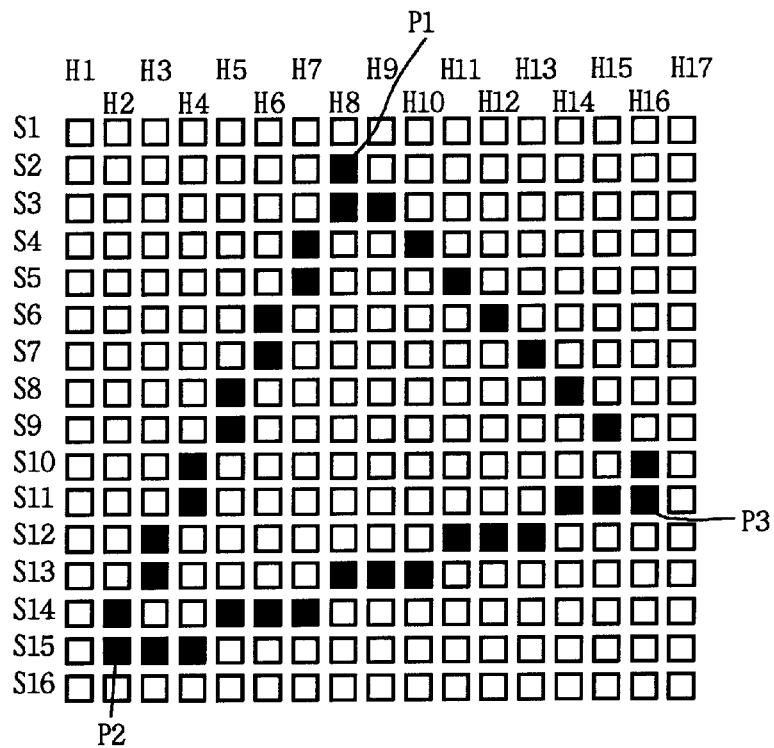

Then, the coordinates of three vertices {(P1 (H8, S2), P2 (H2, S15), P3 (H16, S11)} are externally obtained as the outline information of the polygon to be filled having the outline of FIG. 39 and are stored in a predetermined area of the memory 2 (Step S51 of FIG. 9). The plane work area of the work memory 2A in the memory 2 is blank in an initial state.

In the method for filling a polygon of the fifth preferred embodiment, as shown in FIG. 33, for the triangle to be filled, the line segments L11, L12 and L13 are selected in the order of the vertices P1, P3 and P2 in the clockwise rotation like in the fourth preferred embodiment. The following operation is performed under the control of the CPU 1 based on the program read from the CD-ROM 6.

Figure 40:
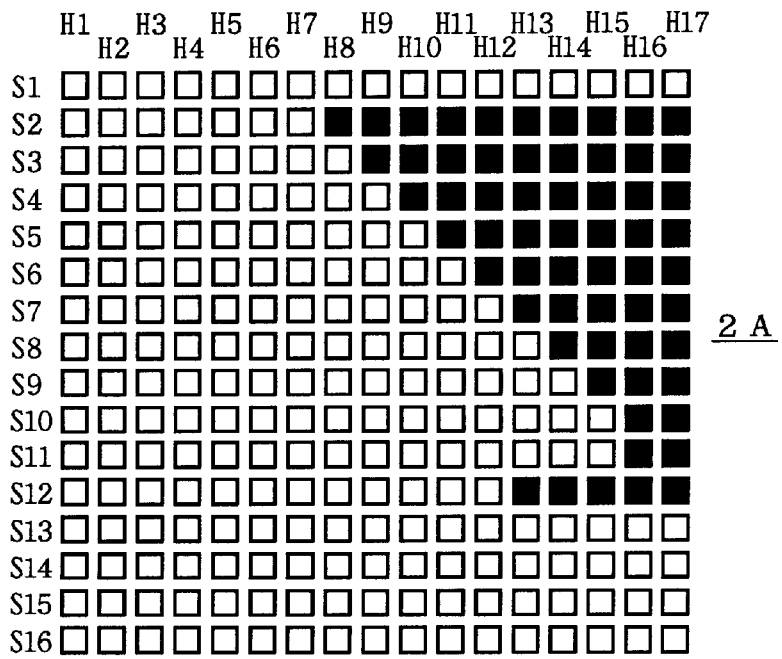
Figure 41:
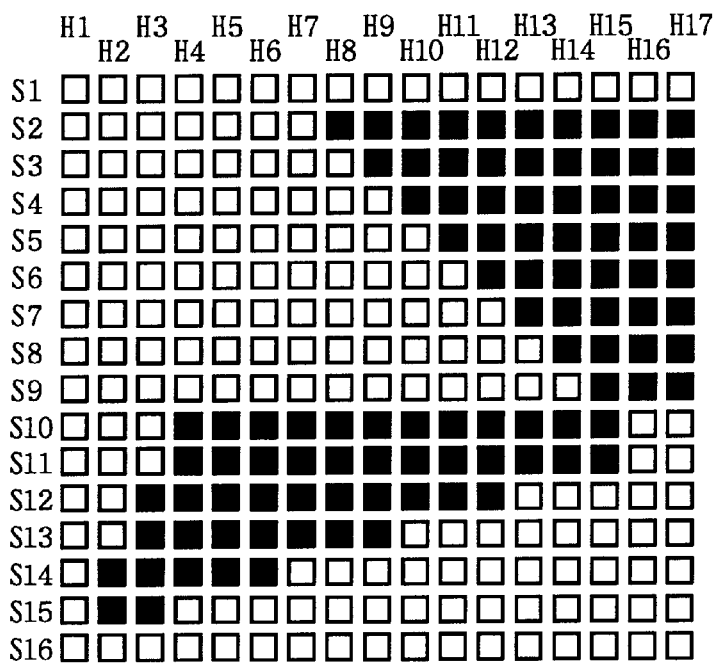
Figure 42:
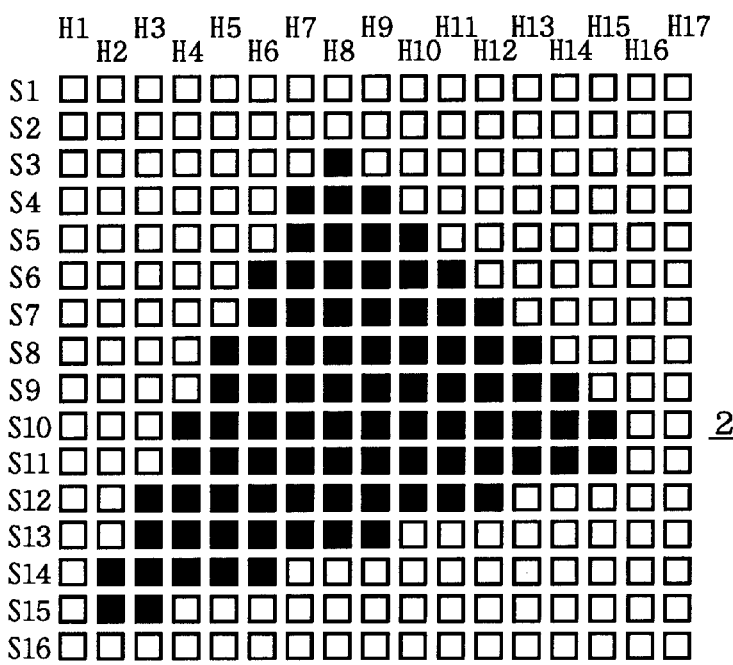

Next, the bit inversion is performed on the work memory 2A as shown in FIGS. 40 to 42 (Step S52 of FIG. 9). The bit inversion will be discussed below.

First, as shown in FIG. 40, the line segment L11 is obtained from the coordinates of the vertices P1 and P3 given as the outline information, using an already-existing linear algorithm such as Bresenham algorithm, and all the bits in the right direction (in a predetermined horizontal direction) of the line segment L11 on the horizontal coordinate, inclusive of those corresponding to the line segment L11, on the plane work area (1 bit/pixel) of the work memory 2A are inverted to draw. FIG. 40 shows a halfway state of the bit inversion of the line segment L11.

Secondly, the line segment L12 is obtained from the coordinates of the vertices P2 and P3 given as the outline information and all the bits in the right direction of the line segment L12 on the horizontal coordinate, inclusive of those corresponding to the line segment L12, on the plane work area of the work memory 2A are inverted.

Similarly, as shown in FIG. 41, the line segment L13 is obtained based on the outline information, and all the bits in the right direction of the line segment L13 on the horizontal coordinate, inclusive of those corresponding to the line segment L13, on the plane work area of the work memory 2A are inverted. At this time, some of the bits which are already drawn by the bit inversion based on the line segments L11 and L12 are inverted again to be back in blank. FIG. 41 shows a halfway state of the bit inversion of the line segment L13.

When the bit inversion is completed, the triangle which is filled inside as shown in FIG. 36 is achieved. But, it is an incompletely-filled triangle with some of the line segments on the right side lacking by bit (pixel).

Figures 43, 44:
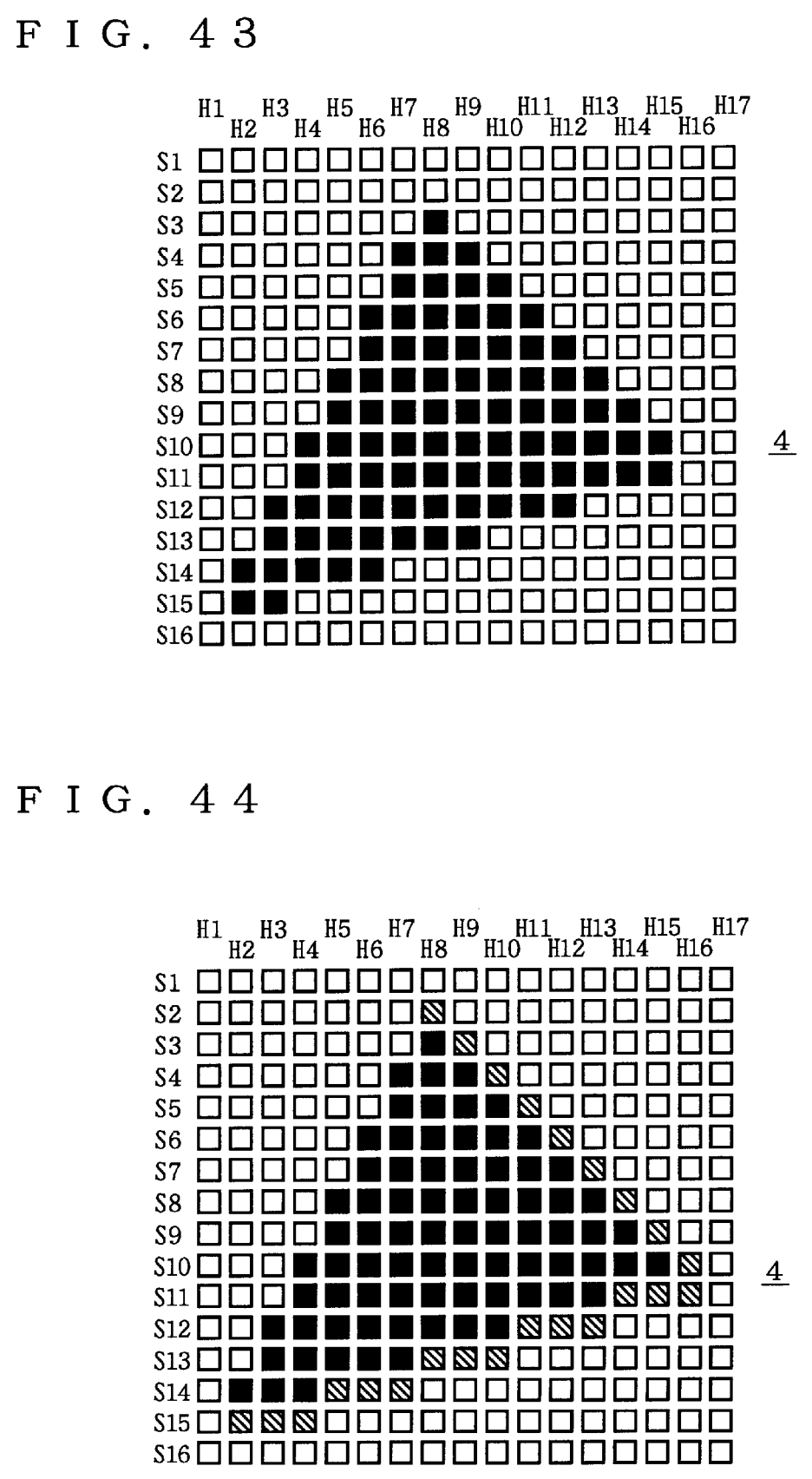

After that, as shown in FIG. 43, the drawing information on the plane work area of the work memory 2A is transferred with extension to the plane display area of the display memory 4 through the bus 10 and the display circuit 3 (Step S53 of FIG. 9).

Subsequently, as shown in FIG. 44, only the line segments L11 and L12 (represented by hatched squares in FIG. 43) whose vectors are in the downward direction (which makes a downward vertical-coordinate variation) among the line segments L11 to L13 which are obtained based on the outline information are further drawn on the display memory 4, to achieve a properly-filled triangle (Step S54 of FIG. 9).

As a result, the triangle which is properly filled inside is displayed on the CRT 5 by the display circuit 3 based on the information stored in the display memory 4.

Thus, in the method for filling a polygon of the fifth preferred embodiment, for a polygon without self-intersection, some of the line segments constituting the outline of the polygon whose vectors are in the downward direction (which makes a downward vertical-coordinate variation) are further drawn on the display memory where the incompletely-filled polygon is drawn by filling the polygon with one of the line segments constituting the outline of the polygon selected sequentially in the clockwise rotation, to properly fill the polygon.

Therefore, instead of all the line segments constituting the polygon, only the line segments on the right side (whose vectors are in the downward direction) of the polygon which are needed for proper filling of the polygon, are efficiently drawn, and much faster drawing of filled polygon is thereby realized.

Further, though the bits inclusive of those for the line segments are inverted (in a first inversion mode) in the above method for filling a polygon of the fifth preferred embodiment, the bits may be inverted non inclusive of those for the line segments (in a second inversion mode). When the bits non inclusive of those for the line segments are inverted, some of the line segments on the left side of the polygon lack. Therefore, after the bit inversion, only the line segments on the left side (whose vectors are in the upward direction) of the polygon are drawn.

Furthermore, though the bits in the right direction of the line segments constituting the polygon are inverted in the above method for filling a polygon of the fifth preferred embodiment, the bits in the left direction of the line segments constituting the polygon may be inverted, based on the same principle. In this case, by further drawing the line segments whose vectors are in the upward direction, the properly-filled polygon can be surely achieved from the incompletely-filled polygon with some of the line segments on the left side lacking by bit (pixel).

The Sixth Preferred Embodiment

FIGS. 45 to 51 are illustrations of the method for filling a polygon in accordance with the sixth preferred embodiment. Any of the hardware constructions of FIGS. 1 to 4 may be used to implement the method for filling a polygon of the sixth preferred embodiment, and for explanatory convenience, the method using the hardware construction of FIG. 1 will be discussed below.

First, the CPU 1 reads a program recording a method for filling a polygon of the sixth preferred embodiment from the CD-ROM 6 through the bus 10. The method for filling a polygon of the sixth preferred embodiment is used for processing a polygon without self-intersection.

Figure 45:
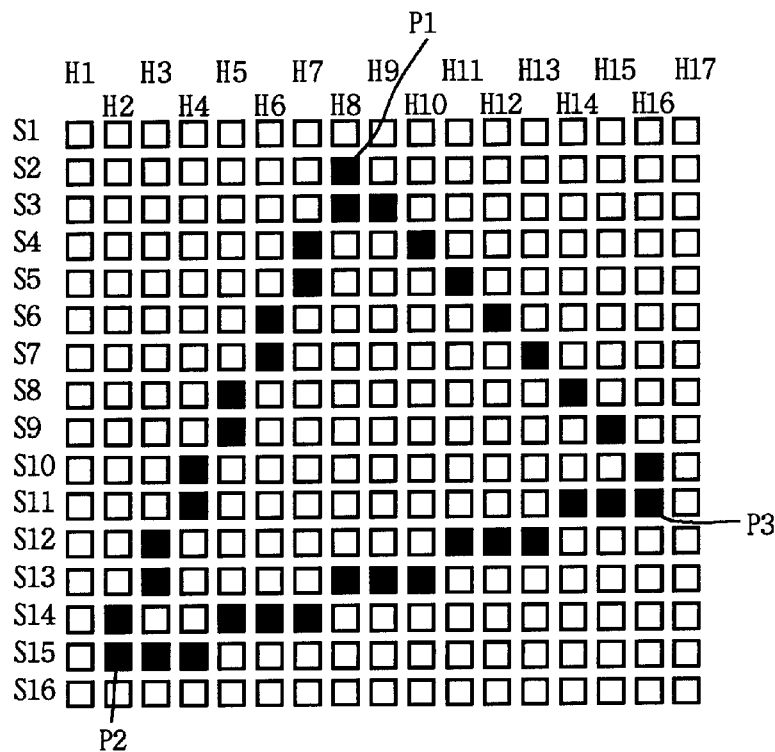
FIGS. 45 to 47 are illustrations of the method for filling a polygon in accordance with the sixth preferred embodiment of the present invention.

Then, the coordinates of three vertices {(P1 (H8, S2), P2 (H2, S11), P3 (H16, S11)} are externally obtained as the outline information of the polygon to be filled having the outline of FIG. 45 and are stored in a predetermined area of the memory 2 (Step S61 of FIG. 10). The plane work area of the work memory 2A in the memory 2 is blank in an initial state.

In the method for filling a polygon of the sixth preferred embodiment, as shown in FIG. 14, for the triangle to be filled, the line segments L1, L2 and L3 are selected in the order of the vertices P1, P2 and P3 in the counterclockwise rotation like in the first to third preferred embodiments. The following operation is performed under the control of the CPU 1 based on the program read from the CD-ROM 6.

Next, the bit inversion is performed on the work memory 2A as shown in FIGS. 46 to 50 (Step S62 of FIG. 10). The bit inversion will be discussed below.

Figure 46:
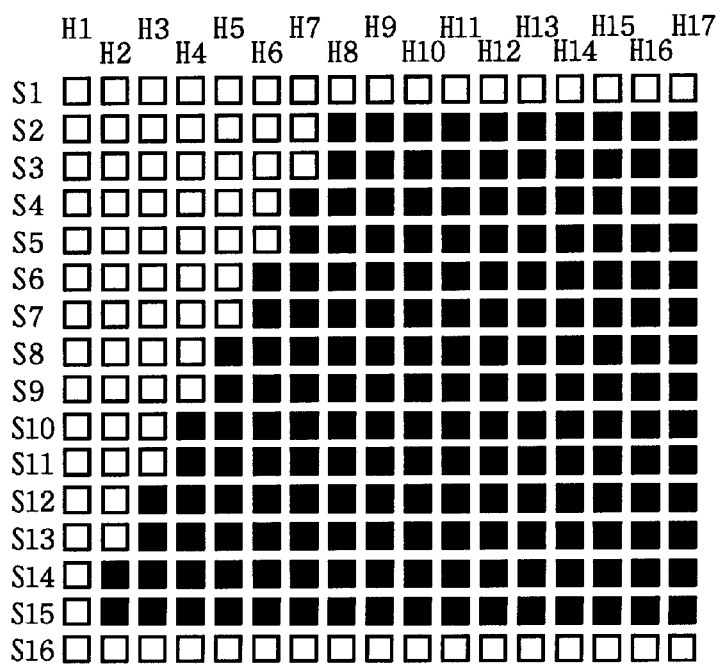

First, the line segment L1 is obtained from the coordinates of the vertices P1 and P2 given as the outline information, using an already-existing linear algorithm such as Bresenham algorithm, and as the line segment L1 is in the downward direction, all the bits in the right direction (in a predetermined horizontal direction) of the line segment L1 on the horizontal coordinate, inclusive of those corresponding to the line segment L1, on the plane work area (1 bit/pixel) of the work memory 2A are inverted to draw (the bit inversion in a first inversion mode), as shown in FIG. 46.

Figure 47:
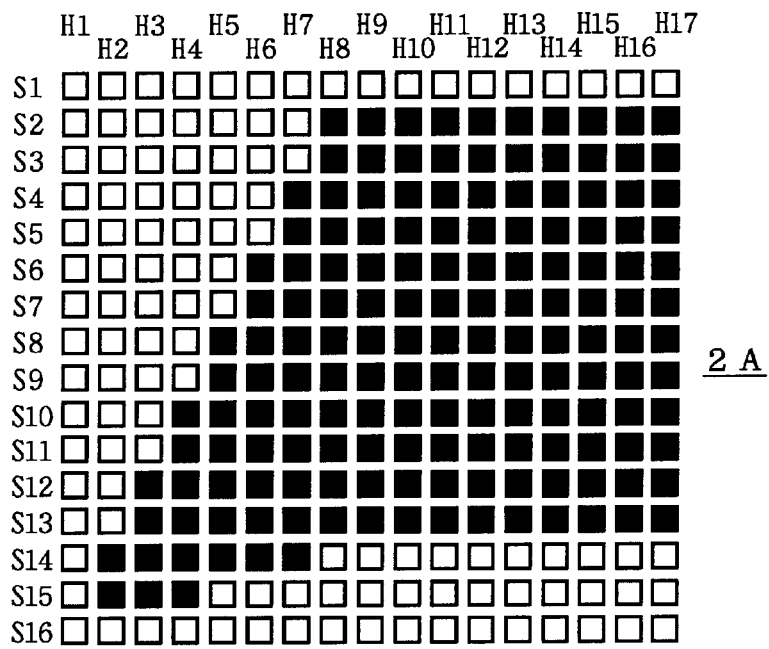
Figure 48:
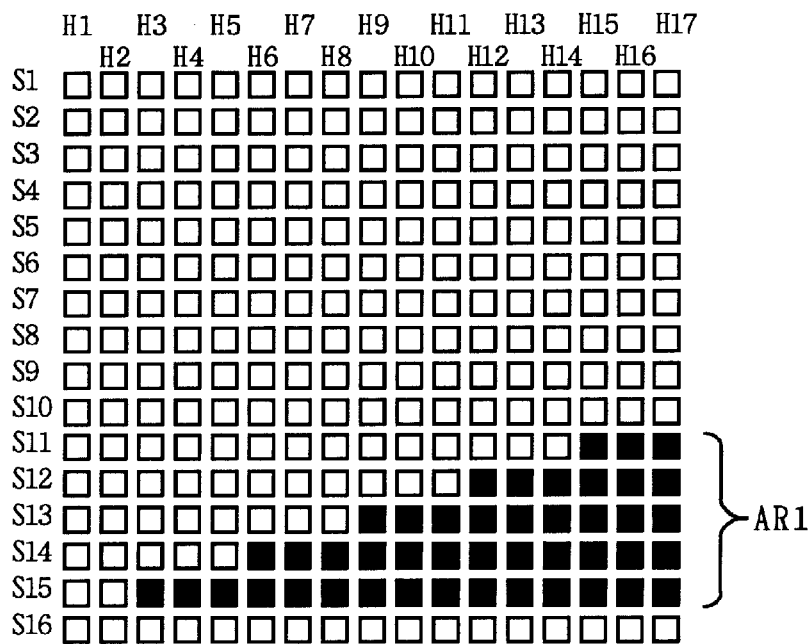
Figures 59, 60:
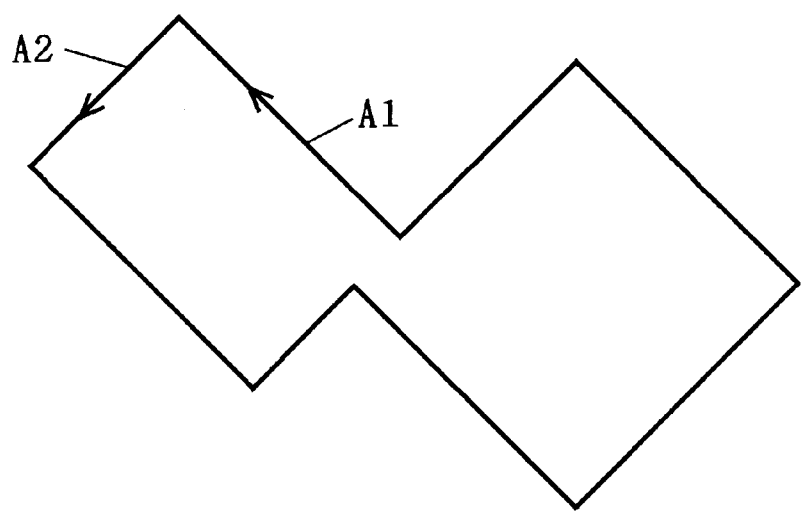
FIG. 59 is an illustration of a background-art scan line method.
FIG. 60 is a schematic view of the background-art scan line method.
Figure 61:
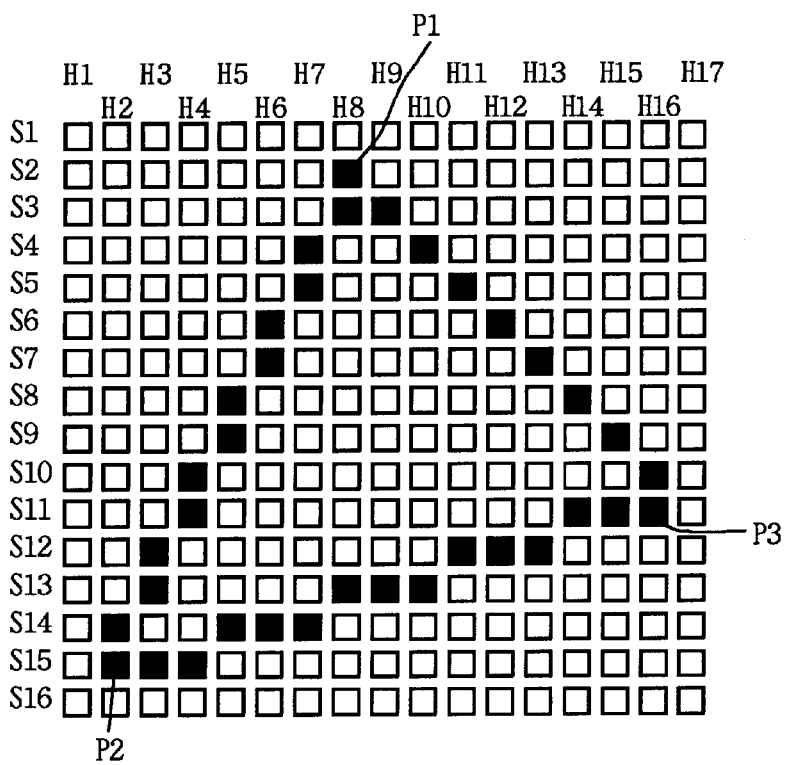
FIG. 61 is an illustration of a background-art outline font method.
Figure 62:
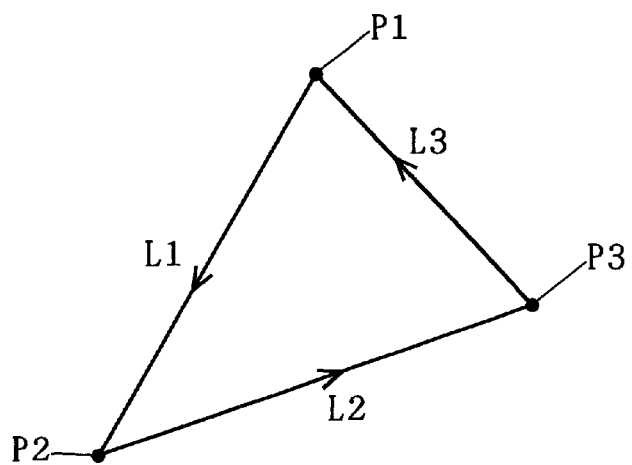
FIG. 62 is a schematic view of the background-art outline font method.
Figure 63:
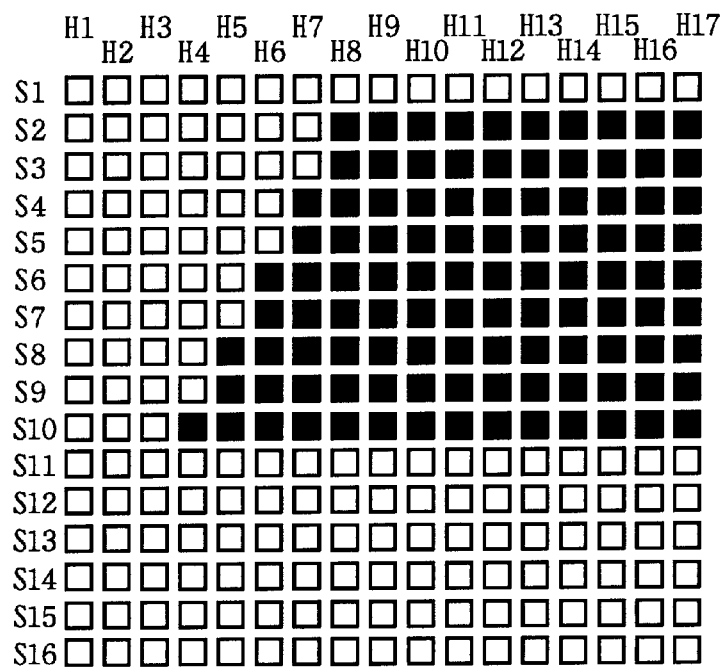
Figure 64:
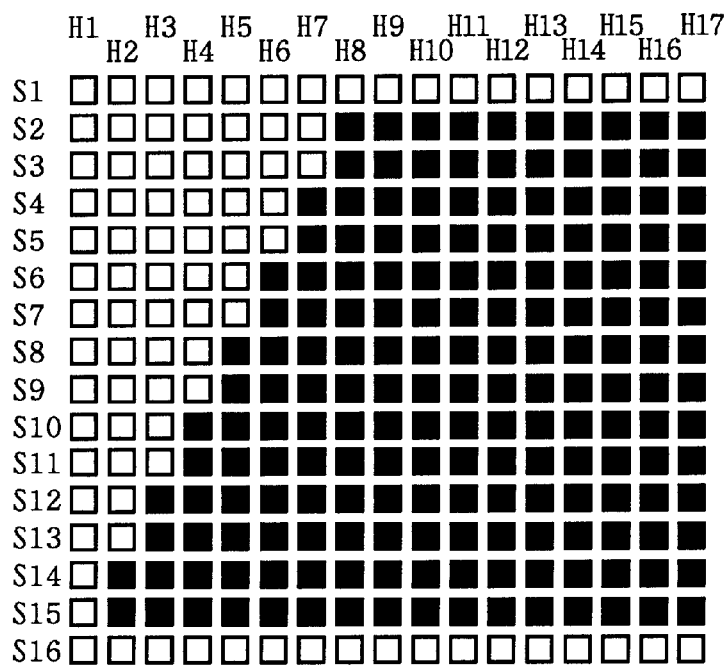

Secondly, the line segment L2 is obtained from the coordinates of the vertices P2 and P3 given as the outline information and as the line segment L2 is in the upward direction, all the bits in the right direction (in a predetermined horizontal direction) of the line segment L2 on the horizontal coordinate, not inclusive of those corresponding to the line segment L2, on the plane work area (1 bit/pixel) of the work memory 2A are inverted to draw (the bit inversion in a second inversion mode, an area AR1 consisting of the solid squares in FIG. 48 is to be inverted), as shown in FIG. 47. As a result, some of the already-drawn bits of FIG. 46 are inverted again to be back in blank.

Figures 49, 50:
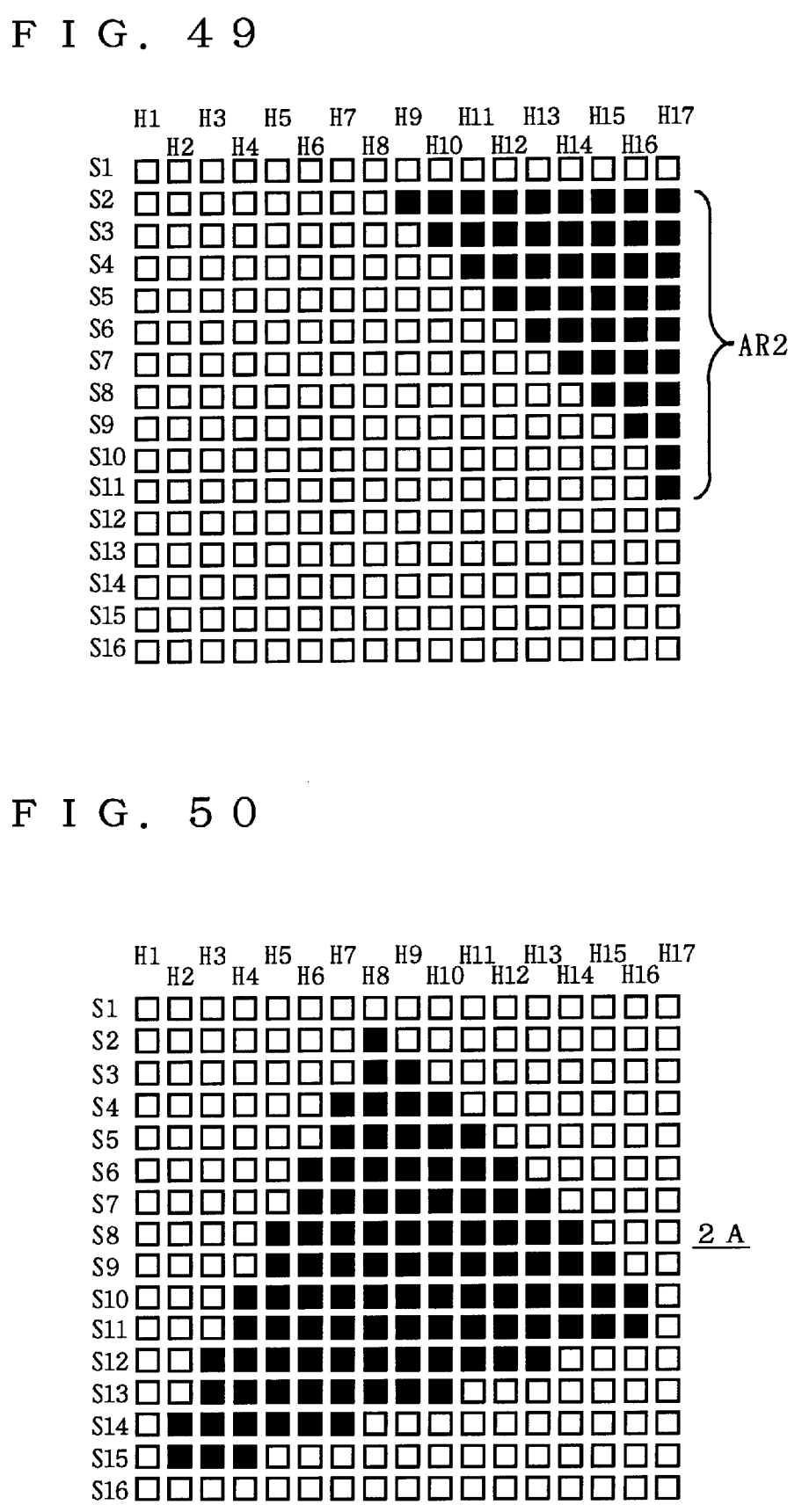

Similarly, the line segment L3 is obtained based on the outline information, and as the line segment L3 is in the upward direction, all the bits in the right direction of the line segment L3 on the horizontal coordinate, not inclusive of those for the line segment L3, on the plane work area of the work memory 2A are inverted (the bit inversion in a second inversion mode, an area AR2 consisting of the solid squares in FIG. 49 is to be inverted). As a result, when the bit inversion is completed, the triangle which is filled inside as shown in FIG. 50 is achieved.

Figures 51, 52:
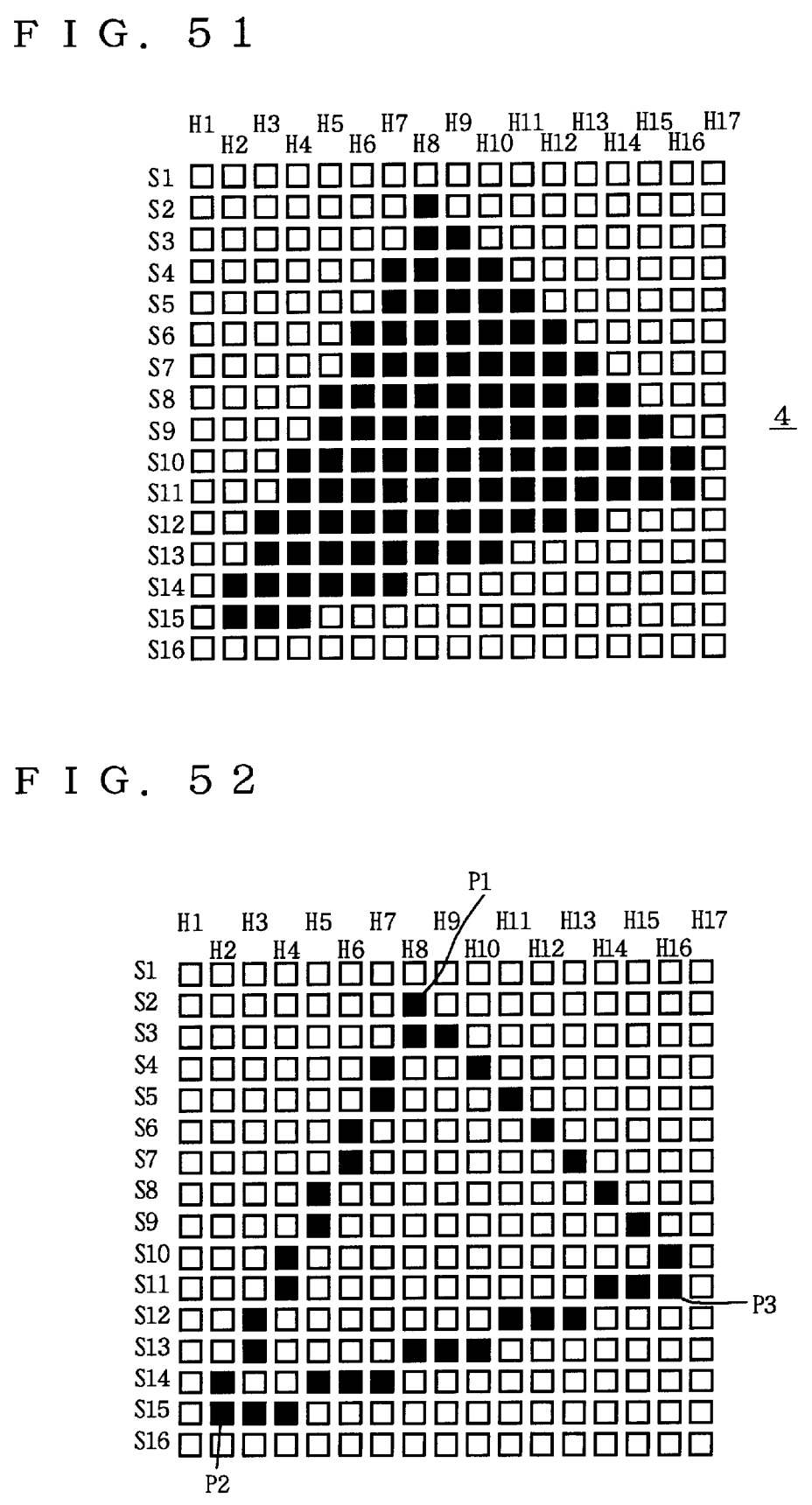

After that, as shown in FIG. 51, the drawing information on the plane work area of the work memory 2A is transferred with extension to the plane display area of the display memory 4 through the bus 10 and the display circuit 3 (Step S63 of FIG. 10).

As a result, the triangle which is properly filled inside is displayed on the CRT 5 by the display circuit 3 based on the information stored in the display memory 4.

Thus, in the method for filling a polygon of the sixth preferred embodiment, for a polygon without self-intersection, with one of the line segments constituting the outline of the polygon selected sequentially in the counterclockwise rotation, the polygon is filled to draw a filled polygon on the work memory. At this time, if the line segment is in the upward direction, the bit inversion is performed in the second inversion mode, not inclusive of bits for the line segment, and otherwise (the line segment is in the downward direction or in the horizontal direction), the bit inversion is performed in the first inversion mode, inclusive of bits for the line segment.

As the amount of memories needed for one pixel is smaller in the work memory than in the display memory, performing all the steps for filling the polygon on the work memory as revealed in the sixth preferred embodiment reduces the number of memory accesses and suppresses the load on the CPU 1, thus achieving faster drawing of filled polygon.

Moreover, since a complete filling of a polygon can be achieved by only one kind of operation, i.e., the bit inversion in the first inversion mode or the second inversion mode, much faster drawing of filled polygon is realized.

Furthermore, though the bits in the right direction of the line segments constituting the polygon are inverted in the above method for filling a polygon of the sixth preferred embodiment, the bits in the left direction of the line segments constituting the polygon may be inverted, based on the same principle. In this case, when the vector of the selected one of the line segments constituting the outline of the polygon is in the downward direction, the bits not inclusive of those for the line segment are inverted, and otherwise the bits inclusive of those for the line segment are inverted.

The Seventh Preferred Embodiment

FIGS. 52 to 58 are illustrations of the method for filling a polygon in accordance with the seventh preferred embodiment. Any of the hardware constructions of FIGS. 1 to 4 may be used to implement the method for filling a polygon of the seventh preferred embodiment, and for explanatory convenience, the method using the hardware construction of FIG. 1 will be discussed below.

First, the CPU 1 reads a program recording a method for filling a polygon of the seventh preferred embodiment from the CD-ROM 6 through the bus 10. The method for filling a polygon of the seventh preferred embodiment is used for processing a polygon without self-intersection.

Then, the coordinates of three vertices {(P1 (H8, S2), P2 (H2, S15), P3 (H16, S11)} are externally obtained as the outline information of the polygon to be filled having the outline of FIG. 52 and are stored in a predetermined area of the memory 2 (Step S71 of Fig. 11). The plane work area of the work memory 2A in the memory 2 is blank in an initial state.

In the method for filling a polygon of the seventh preferred embodiment, as shown in FIG. 33, for the triangle to be filled, the line segments L11, L12 and L13 are selected in the order of the vertices P1, P3 and P2 in the clockwise rotation like in the fourth and fifth preferred embodiments. The following operation is performed under the control of the CPU 1 based on the program read from the CD-ROM 6.

Next, the bit inversion is performed on the work memory 2A as shown in FIGS. 53 to 57 (Step S72 of FIG. 11). The bit inversion will be discussed below.

Figures 53, 54:
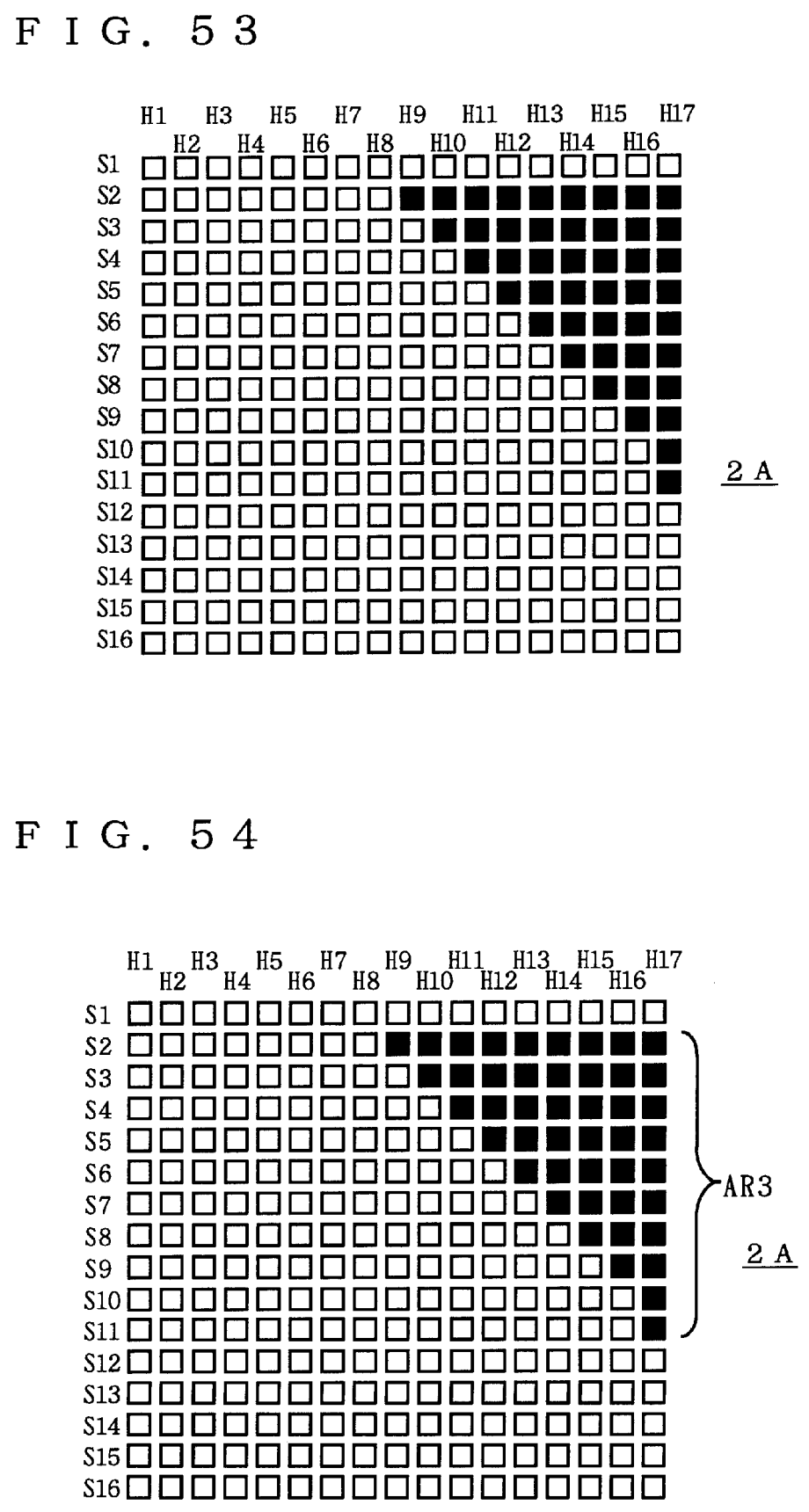

First, the line segment L11 is obtained from the coordinates of the vertices P1 and P3 given as the outline information, using an already-existing linear algorithm such as Bresenham algorithm, and as the line segment L11 is in the downward direction, all the bits in the right direction (in a predetermined horizontal direction) of the line segment Lii on the horizontal coordinate, not inclusive of those corresponding to the line segment L11, on the plane work area (1 bit/pixel) of the work memory 2A are inverted to draw (the bit inversion in a second inversion mode, an area AR3 consisting of the solid squares in FIG. 54 is to be inverted), as shown in FIG. 53.

Figures 55, 56:
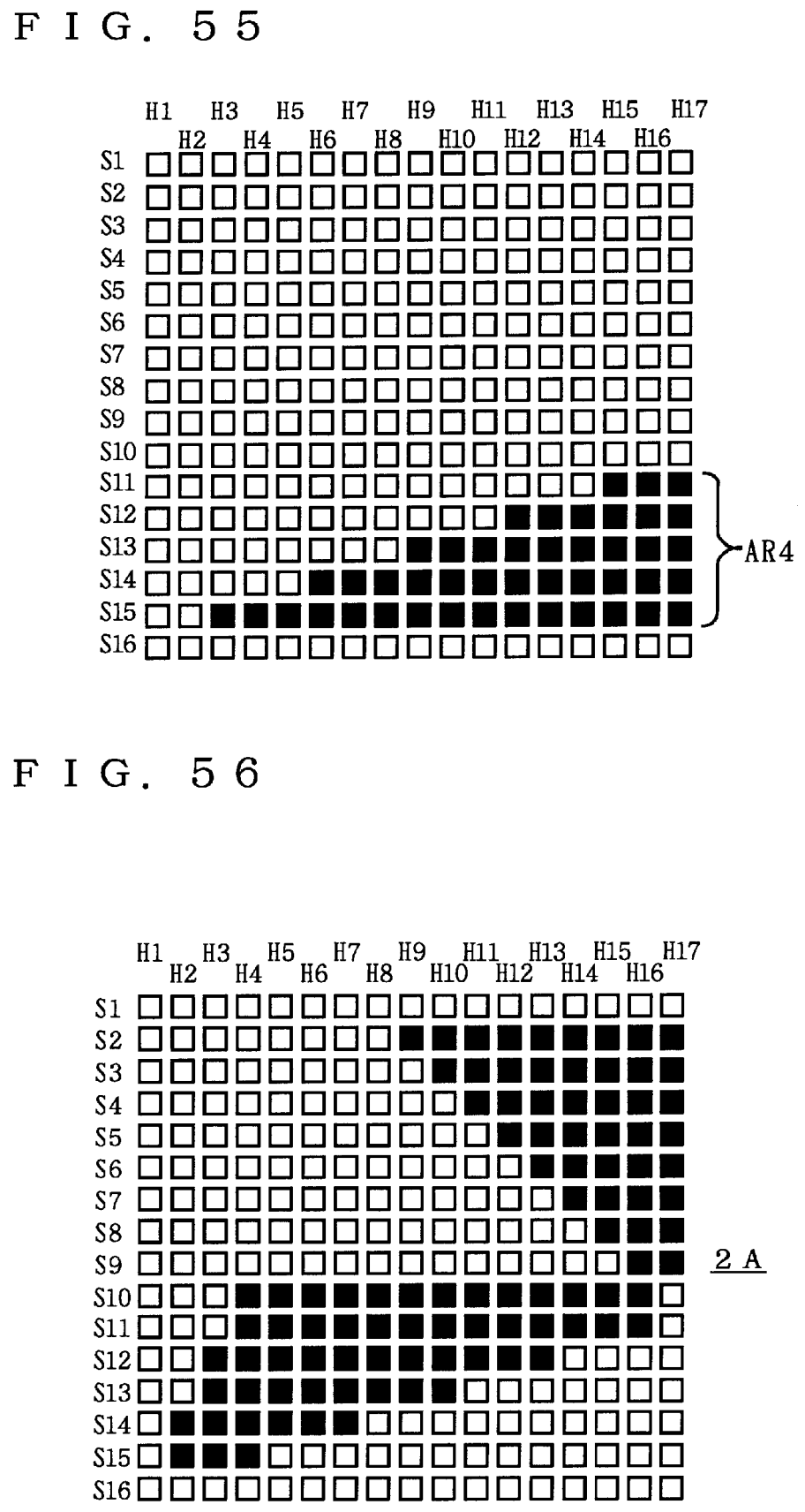

Secondly, the line segment L12 is obtained from the coordinates of the vertices P2 and P3 given as the outline information and as the line segment L12 is in the downward direction, all the bits in the right direction of the line segment L12 on the horizontal coordinate, not inclusive of those corresponding to the line segment L12, on the plane work area (1 bit/pixel) of the work memory 2A are inverted to draw (the bit inversion in a second inversion mode, an area AR4 consisting of the solid squares in FIG. 55 is to be inverted). As a result, some of the already-drawn bits of FIG. 53 are inverted again to be back in blank.

Similarly, the line segment L13 is obtained based on the outline information, and as the line segment L13 is in the upward direction, all the bits in the right direction of the line segment L13 on the horizontal coordinate, inclusive of those corresponding to the line segment L13, on the plane work area of the work memory 2A are inverted (the bit inversion in a first inversion mode), as shown in FIG. 56. FIG. 56 shows a halfway state of the bit inversion of the line segment L13.

Figures 57, 58:
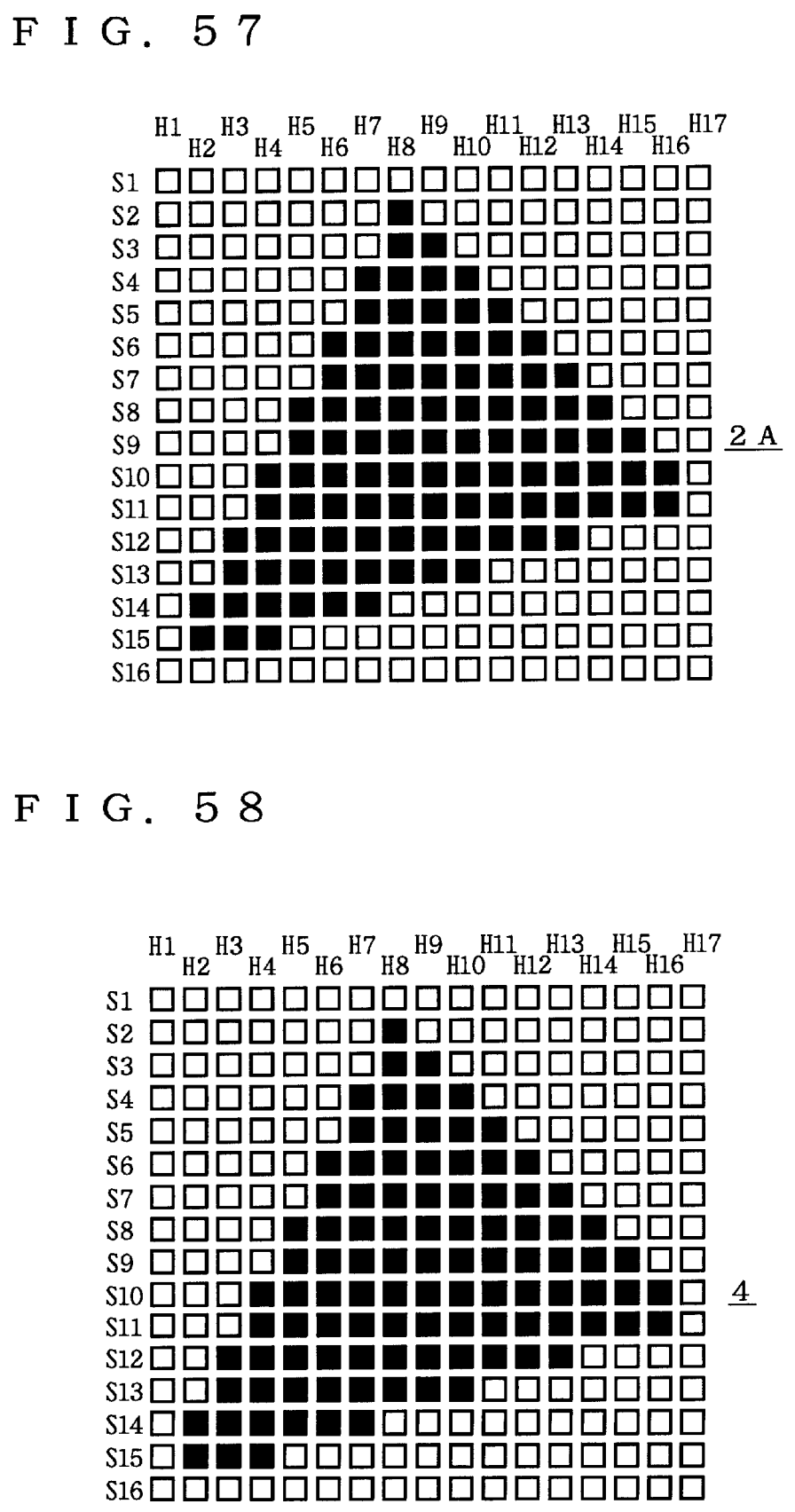

As a result, when the bit inversion is completed, the triangle which is filled inside as shown in FIG. 57 is achieved.

After that, as shown in FIG. 58, the drawing information on the plane work area of the work memory 2A is transferred with extension to the plane display area of the display memory 4 through the bus 10 and the display circuit 3 (Step S73 of FIG. 11).

As a result, the triangle which is properly filled inside is displayed on the CRT 5 by the display circuit 3 based on the information stored in the display memory 4.

Thus, in the method for filling a polygon of the seventh preferred embodiment, for a polygon without self-intersection, with one of the line segments constituting the outline of the polygon selected sequentially in the clockwise rotation, the polygon is filled to draw a filled polygon on the work memory. At this time, if the line segment is in the downward direction, the bit inversion is performed in the second inversion mode, not inclusive of bits for the line segment, and otherwise (the line segment is in the upward direction or in the horizontal direction), the bit inversion is performed in the first inversion mode, inclusive of bits for the line segment.

As the amount of memories needed for one pixel is smaller in the work memory than in the display memory, performing all the steps for filling the polygon on the work memory as revealed in the seventh preferred embodiment reduces the number of memory accesses and suppresses the load on the CPU 1, thus achieving faster drawing of filled polygon.

Moreover, since a complete filling of a polygon can be achieved by only one kind of operation, i.e., the bit inversion in the first inversion mode or the second inversion mode, much faster drawing of filled polygon is realized.

Furthermore, though the bits in the right direction of the line segments constituting the polygon are inverted in the above method for filling a polygon of the seventh preferred embodiment, the bits in the left direction of the line segments constituting the polygon may be inverted, based on the same principle. In this case, when the vector of the selected one of the line segments constituting the outline of the polygon is in the upward direction, the bits not inclusive of those for the line segment are inverted, and otherwise the bits inclusive of those for the line segment are inverted.

While the invention has been shown and described in detail, the foregoing description is in all aspects illustrative and not restrictive. It is therefore understood that numerous modifications and variations can be devised without departing from the scope of the invention.

I claim:

1. A method for filling a polygon, using an image processing system which has a work memory having a rectangular memory area of a plurality of bits, for storing information of one pixel by n (n≧1) bits and a display memory having a rectangular memory area of a plurality of bits, for storing information of one pixel by m (m>n) bits and displays an image based on said information stored in said display memory, to fill the inside of said polygon, said work memory being blank in an initial state, said method comprising the steps of:
  (a) obtaining outline information defining line segments constituting an outline of a polygon to be filled;
  (b) performing bit inversion to make drawing of filled polygon through inverting all bits in a predetermined horizontal direction on a horizontal coordinate of said work memory corresponding to each of said line segments while selecting each of said line segments constituting said outline of said polygon to be filled in a predetermined rotation based on said outline information;
  (c) further drawing said line segments constituting said outline of said polygon to be filled on said work memory where said drawing of filled polygon is performed based on said outline information; and
  (d) transferring information stored in said work memory to said display memory after said step (c).

2. The method of claim 1, wherein
said step (c) includes the step of drawing all said line segments constituting said outline of said polygon to be filled and selected in said predetermined rotation.

3. The method of claim 1, wherein
said polygon to be filled includes a polygon without self-intersection,
said bit inversion in said step (b) includes one of a first inversion mode for inverting bits inclusive of those corresponding to said line segments on said work memory and a second inversion mode for inverting bits not inclusive of those corresponding to said line segments,
said step (c) includes the step of drawing only some of said line segments constituting said outline of said polygon to be filled and selected in said predetermined rotation whose vectors have a vertical variation in a predetermined vertical direction, said predetermined vertical direction being determined by said bit inversion, said predetermined rotation and said predetermined horizontal direction, in which some of said line segments which fail to be drawn, lacking, in said bit inversion of the step (b) have a vertical variation.

4. The method of claim 3, wherein
said bit inversion includes said first inversion mode,
said predetermined rotation includes a counterclockwise rotation,
said predetermined horizontal direction includes a right direction, and
said predetermined vertical direction includes an upward direction.

5. The method of claim 3, wherein
said bit inversion includes said first inversion mode,
said predetermined rotation includes a clockwise rotation,
said predetermined horizontal direction includes a right direction, and
said predetermined vertical direction includes a downward direction.

6. The method of claim 3, wherein
said bit inversion includes said second inversion mode,
said predetermined rotation includes a counterclockwise rotation,
said predetermined horizontal direction includes a right direction, and
said predetermined vertical direction includes a downward direction.

7. The method of claim 3, wherein
said bit inversion includes said second inversion mode,
said predetermined rotation includes a clockwise rotation,
said predetermined horizontal direction includes a right direction, and
said predetermined vertical direction includes an upward direction.

8. The method of claim 3, wherein
said bit inversion includes said first inversion mode,
said predetermined rotation includes a counterclockwise rotation,
said predetermined horizontal direction includes a left direction, and
said predetermined vertical direction includes a downward direction.

9. The method of claim 3, wherein
said bit inversion includes said first inversion mode,
said predetermined rotation includes a clockwise rotation,
said predetermined horizontal direction includes a left direction, and
said predetermined vertical direction includes an upward direction.

10. A computer-readable recording medium for recording a program by which a computer performs the method for filling a polygon in accordance with claim 1.

11. A method for filling a polygon, using an image processing system which has a work memory having a rectangular memory area of a plurality of bits, for storing information of one pixel by n (n≧1) bits and a display memory having a rectangular memory area of a plurality of bits, for storing information of one pixel by m (m>n) bits and displays an image based on said information stored in said display memory, to fill the inside of said polygon, said work memory being blank in an initial state,
said method comprising the steps of:
  (a) obtaining outline information defining line segments constituting an outline of a polygon without self-intersection to be filled; and
  (b) performing bit inversion to make drawing of filled polygon through inverting all bits in a predetermined horizontal direction on a horizontal coordinate of said work memory corresponding to each of said line segments while selecting each of said line segments constituting said outline of said polygon to be filled in a predetermined rotation based on said outline information;
wherein said bit inversion includes one of a first inversion mode for inverting bits inclusive of those corresponding to said line segments on said work memory and a second inversion mode for inverting bits not inclusive of those corresponding to said line segments,
said method further comprising the steps of;
  (c) transferring information stored in said work memory to said display memory after said step (b); and
  (d) drawing only some of said line segments constituting said outline of said polygon to be filled and selected in said predetermined rotation whose vectors have a vertical variation in a predetermined vertical direction on said display memory based on said outline information after said step (c), said predetermined vertical direction being determined by said bit inversion, said predetermined rotation and said predetermined horizontal direction, in which some of said line segments which fail to be drawn, lacking, in said bit inversion of the step (b) have a vertical variation.

12. The method of claim 11, wherein
said bit inversion includes said first inversion mode,
said predetermined rotation includes a counterclockwise rotation,
said predetermined horizontal direction includes a right direction, and
said predetermined vertical direction includes an upward direction.

13. The method of claim 11, wherein
said bit inversion includes said first inversion mode,
said predetermined rotation includes a clockwise rotation,
said predetermined horizontal direction includes a right direction, and
said predetermined vertical direction includes a downward direction.

14. The method of claim 11, wherein
said bit inversion includes said second inversion mode,
said predetermined rotation includes a counterclockwise rotation,
said predetermined horizontal direction includes a right direction, and
said predetermined vertical direction includes a downward direction.

15. The method of claim 11, wherein
said bit inversion includes said second inversion mode,
said predetermined rotation includes a clockwise rotation,
said predetermined horizontal direction includes a right direction, and
said predetermined vertical direction includes an upward direction.

16. A computer-readable recording medium for recording a program by which a computer performs the method for filling a polygon in accordance with claim 11.

17. A method for filling a polygon, using an image processing system which has a work memory having a rectangular memory area of a plurality of bits, for storing information of one pixel by n (n≧1) bits and a display memory having a rectangular memory area of a plurality of bits, for storing information of one pixel by m (m>n) bits and displays an image based on said information stored in said display memory, to fill the inside of said polygon, said work memory being blank in an initial state, said method comprising the steps of:
- (a) obtaining outline information defining line segments constituting an outline of a polygon without self-intersection to be filled;
- (b) performing bit inversion to make drawing of filled polygon through inverting all bits in a predetermined horizontal direction on a horizontal coordinate of said work memory corresponding to each of said line segments while selecting each of said line segments constituting said outline of said polygon to be filled in a predetermined rotation based on said outline information;
- (c) transferring information stored in said work memory to said display memory after said step (b), wherein said bit inversion includes a first inversion mode for inverting bits inclusive of those corresponding to said line segments on said work memory and a second inversion mode for inverting bits not inclusive of those corresponding to said line segments, and some of said line segment constituting said outline of said polygon to be filled and selected in said predetermined rotation whose vectors have a vertical variation in a first vertical direction are subjected to said bit inversion in said first inversion mode and some whose vectors have a vertical variation in a second vertical direction are subjected to said bit inversion in said second inversion mode, said first and second vertical directions being determined by said predetermined rotation and said predetermined horizontal direction so that said some of said line segments whose vectors have a vertical variation in said first vertical direction can be drawn with no lack when said bit inversion is performed in said first inversion mode and said some of said line segments whose vectors have a vertical variation in said second vertical direction can be drawn with no lack when said bit inversion is performed in said second inversion mode.

18. The method of claim 17, wherein said predetermined rotation includes a counterclockwise rotation, said predetermined horizontal direction includes a right direction, said first predetermined vertical direction includes a downward direction, and said second predetermined vertical direction includes an upward direction.

19. The method of claim 17, wherein said predetermined rotation includes a clockwise rotation, said predetermined horizontal direction includes a right direction, said first predetermined vertical direction includes an upward direction, and said second predetermined vertical direction includes a downward direction.

20. A computer-readable recording medium for recording a program by which a computer performs the method for filling a polygon in accordance with claim 17.

* * * * *